US012669450B2

(12) United States Patent
Yoshimoto

(10) Patent No.: US 12,669,450 B2
(45) Date of Patent: Jun. 30, 2026

(54) CORRECTION APPARATUS, SYSTEM, METHOD, AND PROGRAM

(71) Applicant: RIGAKU CORPORATION, Tokyo (JP)

(72) Inventor: Masatsugu Yoshimoto, Akishima (JP)

(73) Assignee: RIGAKU CORPORATION, Tokyo (JP)

( * ) Notice: Subject to any disclaimer, the term of this patent is extended or adjusted under 35 U.S.C. 154(b) by 565 days.

(21) Appl. No.: 18/122,862

(22) Filed: Mar. 17, 2023

(65) Prior Publication Data

US 2023/0296539 A1 Sep. 21, 2023

(30) Foreign Application Priority Data

Mar. 18, 2022 (JP) .................................. 2022-044391
Nov. 30, 2022 (JP) .................................. 2022-191309

(51) Int. Cl.
*G01N 23/207* (2018.01)
*G01N 23/20016* (2018.01)

(52) U.S. Cl.
CPC ..... *G01N 23/207* (2013.01); *G01N 23/20016* (2013.01); *G01N 2223/1016* (2013.01); *G01N 2223/304* (2013.01); *G01N 2223/345* (2013.01)

(58) Field of Classification Search
CPC ... G01N 2223/1016; G01N 2223/1013; G01N 2223/101; G01N 2223/1006; G01N 2223/10; G01N 2223/304; G01N 2223/30; G01N 2223/345; G01N 23/20016;

(Continued)

(56) References Cited

U.S. PATENT DOCUMENTS

2014/0114602 A1* 4/2014 Billinge ............... G01N 23/207
702/104

OTHER PUBLICATIONS

Lin, Z., & Zhigilei, L. V. (2006). Time-resolved diffraction profiles and atomic dynamics in short-pulse laser-induced structural transformations: Molecular dynamics study. Physical Review B—Condensed Matter and Materials Physics, 73(18), 184113. (Year: 2006).*

(Continued)

*Primary Examiner* — Catherine T. Rastovski
*Assistant Examiner* — Brian Butler Guiss
(74) *Attorney, Agent, or Firm* — XSENSUS LLP

(57) ABSTRACT

A correction apparatus for correcting a structure factor includes a structure factor acquisition section that acquires the structure factor; a PDF calculation section that calculates PDF from the acquired structure factor; a correction function preparation section that prepares a first correction function that is Fourier-transformed in a predetermined range, and a second correction function that is Fourier-transformed in the predetermined range, the first correction function comprising data of the PDF and a cut-off function for cutting off data on a long distance side of the PDF and the second correction function comprising the cut-off function; a correction amount calculation section that calculates a correction amount comprising the first correction function, the second correction function, and a scale factor; a structure factor correction section that corrects the structure factor; and an R-factor value calculation section that calculates an R-factor value indicating correction accuracy.

9 Claims, 16 Drawing Sheets

(58) Field of Classification Search
CPC .. G01N 23/20008; G01N 23/20; G01N 23/00;
G01N 23/207
See application file for complete search history.

(56) References Cited

OTHER PUBLICATIONS

Giannini, C., Ladisa, M., Altamura, D., Siliqi, D., Sibillano, T., & De Caro, L. (2016). X-ray diffraction: a powerful technique for the multiple-length-scale structural analysis of nanomaterials. Crystals, 6(8), 87. (Year: 2016).*
Fiveable. (Jul. 31, 2024). Radial Distribution Function—Physical Chemistry I. https://library.fiveable.me/key-terms/physical-chemistry-i/radial-distribution-function (Year: 2024).*
Peterson et al., "Improved measures of quality for the atomic pair distribution function", Journal of Applied Crystallography, vol. 36, 2003, pp. 53-64.
Antipas et al., "Direct determination of amorphous number density from the reduced pair distribution function", Elsevier, MethodsX 6, 2019, pp. 601-605.

* cited by examiner

CORRECTION APPARATUS, SYSTEM, METHOD, AND PROGRAM

CROSS-REFERENCE TO RELATED APPLICATION

This application claims priority to Japanese Patent Application No. 2022-044391, filed Mar. 18, 2022, and Japanese Patent Application No. 2022-191309, filed Nov. 30, 2022, which are incorporated herein by reference in their entirety.

BACKGROUND

Field

The present disclosure relates to a correction apparatus for correcting a structure factor, and to a system, a method and a program therefor.

Description of the Related Art

In order to deeply understand materials functions, three-dimensional structure information is indispensable. Many of conventional materials are crystalline materials, and thus objectives have been able to be achieved by determining crystal structures. However, for batteries, materials in the field of electronics and so forth in recent years, many of those that are non-crystalline (amorphous), whose interfaces are controlled have been available in order to maximize aimed function thereof.

Structure-modeling is required for acquiring an amorphous structure feature amount, and density is a required item for modeling. According to a material whose interface as described above is controlled, it is nevertheless difficult to estimate density thereof with a conventional method (Archimedes method or the like). Thus, a density estimation technique of modeling scale is in demand.

Non-Patent Document 1 paying attention to asymptotic behavior of PDF (Pair Distribution Function) introduces criteria for automatically correcting PDF, and the criteria is disclosed. According to Non-Patent Document 2, disclosed is the method of extending the density estimation method by PDF to those that are amorphous.

NON-PATENT DOCUMENT

[Non-Patent Document 1] Peter F. Peterson, Emil S. Bozin, Thoms Proffen, Simon J. L. Billinge. J. Appl. Cryst. (2003), 36, p. 53-64
[Non-Patent Document 2] Georgios S. E. Antipas, Konstantinos T. Karalis, Method X (2019), 6, p. 601-605

However, in Non-Patent Document 1 and Non-Patent Document 2, it is not taken into account that attention is paid to the noise on the short distance side of PDF to correct the structure factor.

SUMMARY

After considerable effort during intensive studies, the inventors have found out that the structure factor can be corrected by searching density using data in the wider range of PDF, in comparison to a conventional method; and thus the resulting density accuracy is highly improved. It is also found out that only the structure factor can be corrected by applying the method thereto with density as being previously known, and the present invention has been accomplished.

The present disclosure has been made in view of such a situation, and it is an object to provide a correction apparatus capable of correcting a structure factor calculated from total scattering data, and to provide a system, a method and a program therefor.

(1) In order to achieve the above-described object, it is a feature that the correction apparatus according to the present disclosure is a correction apparatus for correcting a structure factor, the correction apparatus comprises a structure factor acquisition section that acquires the structure factor; a PDF calculation section that calculates PDF (Pair Distribution Function) from the acquired structure factor; a correction function preparation section that prepares a first correction function that is Fourier-transformed in a predetermined range, and a second correction function that is Fourier-transformed in the predetermined range, the first correction function comprising data of the PDF and a cut-off function for cutting off data on a long distance side of the PDF and the second correction function comprising the cut-off function; a correction amount calculation section that calculates a correction amount comprising the first correction function, the second correction function, and a scale factor; a structure factor correction section that corrects the structure factor using the correction amount; and an R-factor value calculation section that calculates an R-factor value indicating correction accuracy, the R-factor value comprising the first correction function and the second correction function.

(2) Further, it is a feature that in the correction apparatus according to the present disclosure, further comprising a density calculation section that calculates density based on the first correction function and the second correction function, the scale factor is the density calculated by the density calculation section, and the R-factor value indicates a change rate of the density calculated by the density calculation section.

(3) Further, it is a feature that in the correction apparatus according to the present disclosure, further comprising a ratio calculation section that calculates a ratio at which a constraint term is weighted, the density calculation section calculates the constraint term based on a value of each of the first correction function and the second correction function in a limited range; the density comprises a product of the constraint term and the ratio; and the ratio increases or decreases according to increase/decrease of the R-factor value.

(4) Further, it is a feature that the correction apparatus according to the present disclosure, the scale factor is a predetermined value.

(5) Further, it is a feature that in the correction apparatus according to the present disclosure, further comprising a peak position determination section that determines a first peak position $r_{1st}$ of the PDF, the predetermined range is from 0 to $r_{1st}$.

(6) Further, it is a feature that in the correction apparatus according to the present disclosure, the cut-off function is a monotone decreasing function taking a value of from 1 to 0 in a domain of the cut-off function.

(7) Further, it is a feature that in the correction apparatus according to the present disclosure, further comprising a structure factor calculation section that calculates the structure factor based on a type of a radiation source, a wavelength, a shape of a sample, arrangement, kinds of constituent elements, a composition and an absorption coefficient in total scattering data by acquiring the total scattering data of the sample, the structure factor acquisition section acquires the structure factor calculated by the structure factor calculation section.

(8) Further, it is a feature that the system according to the present disclosure is a system comprising an X-ray diffractometer comprising an X-ray generator that generates X-rays, a detector that detects the X-rays, and a goniometer; and the correction apparatus according to any one of (1) to (7) as described above.

(9) Further, it is a feature that the method according to the present disclosure is a method for correcting a structure factor, the method comprising a structure factor acquisition step of acquiring the structure factor; a PDF calculation step of calculating PDF (Pair Distribution Function) from the acquired structure factor; a correction function preparation step of preparing a first correction function that is Fourier-transformed in a predetermined range, and a second correction function that is Fourier-transformed in the predetermined range, the first correction function comprising data of the PDF and a cut-off function for cutting off data on a long distance side of the PDF, and the second correction function comprising the cut-off function; a correction amount calculation step of calculating a correction amount comprising the first correction function, the second correction function, and a scale factor; a structure factor correction step of correcting the structure factor using the correction amount; and an R-factor value calculation step of calculating an R-factor value indicating correction accuracy, the R-factor value comprising the first correction function and the second correction function.

(10) Further, it is a feature that the program according to the present disclosure is a program for correcting a structure factor, causing a computer to execute the processes of acquiring the structure factor; calculating PDF (Pair Distribution Function) from the acquired structure factor; preparing a first correction function that is Fourier-transformed in a predetermined range, and a second correction function that is Fourier-transformed in the predetermined range, the first correction function comprising data of the PDF and a cut-off function for cutting off data on a long distance side of the PDF, and the second correction function comprising the cut-off function; calculating a correction amount comprising the first correction function, the second correction function, and a scale factor; correcting the structure factor using the correction amount; and calculating an R-factor value indicating correction accuracy, the R-factor value comprising the first correction function and the second correction function.

DETAILED DESCRIPTION

Figure 1:
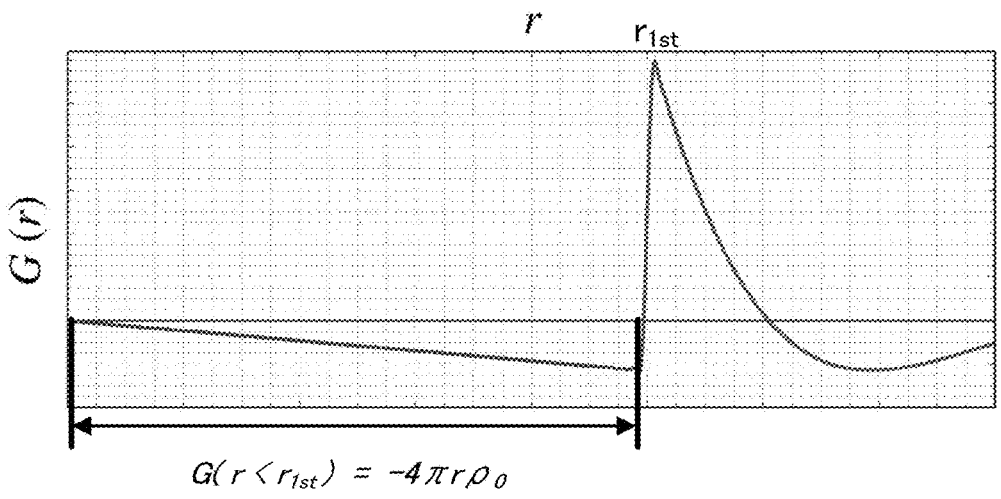
FIG. 1 is a graph showing a method of determining a density $\rho_0$ from a graph of PDF by a conventional method.

Next, embodiments of the present disclosure are described referring to the drawings. In order to facilitate understanding of the description, reference number indicating the same constituent element is used as same and overlapping descriptions are omitted in each drawing.

Principle

PDF (Pair Distribution Function) means an analysis method for describing atoms adjacent to an arbitrary atom as a center. Information directly obtained from PDF includes, for example, a peak position, a peak area, a peak width, and so forth. The peak position, the peak area and the peak width mean a distance between neighboring atoms, information related to the coordination number and information indicating the degree of distribution, respectively.

FIG. 1 is a graph showing a method of determining a density $\rho_0$ from a graph of PDF by a conventional method. As shown in FIG. 1, according to a conventional technique, the density $\rho_0$ has been calculated from a slope by linearly approximating data less than the first peak position $r_{1st}$ of PDF. This is because it may be considered that there is no structure (signal of structure) in less than the first peak position in an ideal state. PDF G(r) is represented by the following formula (1).

$$G(r)=4\pi r(\rho(r)-\rho_0) \qquad (1)$$

Herein, $\rho(r)$ represents a local density (signal by structure), and $\rho_0$ represents density of the average number of atoms inside a system. Assuming that no signal of PDF is observed in smaller than the first peak, $\rho(r)=0$ when $r<r_{1st}$, and thus the foregoing can be rewritten as shown below.

$$G(r<r_{1st})=-4\pi r\rho_0 \qquad (2)$$

5

Thus, if it is correct that "there is no structure in less than the first peal position", the density $\rho_0$ obtained by calculating data in less than the first peak position $r_{1st}$ of PDF from the linearly approximated slope also becomes a correct value. However, PDF generally includes a noise, and thus accuracy of calculated density is deteriorated in a conventional linear approximation method while neglecting the noise on the short distance side of PDF, thereby showing a significant impact thereof when being an amorphous material.

The noise on the short distance side of PDF is derived from mistakes such as measurement errors of original total scattering data and so forth, or mistakes at the time when calculating the structure factor. Further, though the structure factor is originally calculated from the total scattering data in the infinite range, the structure factor, and PDF calculated from it each need to be limited to the finite range. Thus, a truncation error is included, thereby not being likely to essentially become an ideal state.

Accordingly, the method according to the present disclosure is as follows. When both sides of formula (2) are Fourier-transformed in the predetermined range in less than $r_{1st}$, and the left side is represented by a(Q) and the right side is represented by b' (Q); a(Q) and b' (Q) each are expressed as shown below.

$$a(Q) = \int_0^{r<r_{1st}} G_{obs}(r) \frac{\sin Qr}{Q} dr \tag{3}$$

$$b'(Q) = \int_0^{r<r_{1st}} -4\pi r \rho_0 \frac{\sin Qr}{Q} dr \tag{4}$$

Then, when b(Q) is expressed by the following formula (5), b' (Q) is given as shown in the formula (6), using b(Q).

$$b(Q) = \int_0^{r<r_{1st}} -4\pi r \frac{\sin Qr}{Q} dr \tag{5}$$

$$b'(Q) = \rho_0 b(Q) \tag{6}$$

Then, $\rho_0$ obtained by minimizing residual error of a(Q) and b(Q) is determined. In the case of the total scattering data not being in an ideal state, a value determined in this manner becomes closer to an actual density than the density determined from the slope obtained by linearly approximating the data in less than the first peak position $r_{1st}$ of PDF. Further, the structure factor can also be corrected using a(Q) and b(Q).

Further, according to a different mode of the present disclosure, when the actual density or a value close to it is known, $\rho_0$ in the formula (6) is fixed to the value $\alpha$. Then, the structure factor can be corrected by correcting a(Q) in such a manner that a(Q) and $\alpha$ b(Q) are identical to each other with predetermined accuracy.

According to the structure factor corrected as described above, the noise on the short distance side of PDF calculated based on it becomes small, and thus accuracy of information acquired from the corrected structure factor and PDF is highly enhanced. The detailed correction method according to the present disclosure is detailed in the embodiment.

EMBODIMENT

The correction method according to the present disclosure is explained in detail, as described below. A method of correcting the structure factor while estimating the density by using the total scattering data measured by an X-ray diffractometer, and a method of correcting the structure factor by assuming that the density is previously known are described as below. However, the total scattering data to which the present disclosure can be applied is not limited to the total scattering data measured by an X-ray diffractometer, and be applied to the total scattering data measured by a probe similar thereto. For example, it can be applied to the total scattering data given via radiation and to the total scattering data given via particle beam. Further, the present disclosure does not necessarily require acquisition of the total scattering data, and thus the structure factor calculated from the total scattering data may be taken as first data.

In addition, $\rho_0$ often represents density in those described in the present specification, but actually represents density of the average number of atoms. Conversion from density of the average number of atoms $\rho_0$ (atoms/A$^2$) into normal density $\rho_{bulk}$ (g/cm$^3$) can be easily made by the following formula (7). In the formula (7), M represents formula weight (or molecular weight, or atomic weight) in a composition formula of a material, and n represents the number of atoms contained in the composition formula (M and n being values calculated from the same composition formula).

$$\rho_{bulk} = 0.602214086 \times \rho_0 \times \frac{M}{n} \tag{7}$$

Embodiment 1

Figure 2:
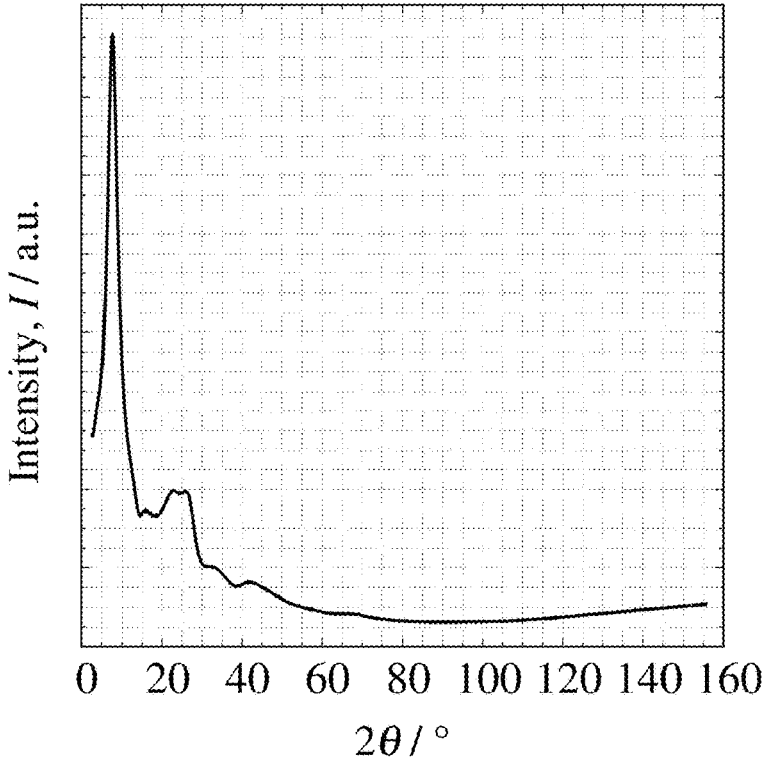
FIG. 2 is a graph showing one example of total scattering data.

A method of correcting the structure factor while estimating density using the total scattering data measured by an X-ray diffractometer is described in the embodiment 1. First, the total scattering data is acquired. When the total scattering data is set as the first data, information required for calculating the structure factor based on the total scattering data may be also acquired, such as a type of a radiation source, a wavelength, a background, a shape of a sample, arrangement, kinds of constituent elements, a composition, an absorption coefficient, or the like in the total scattering data. These pieces of information may be those stored in advance, or be those acquired from an X-ray diffractometer. Further, they may be those input by a user. FIG. 2 is a graph showing one example of the total scattering data.

Figure 3:
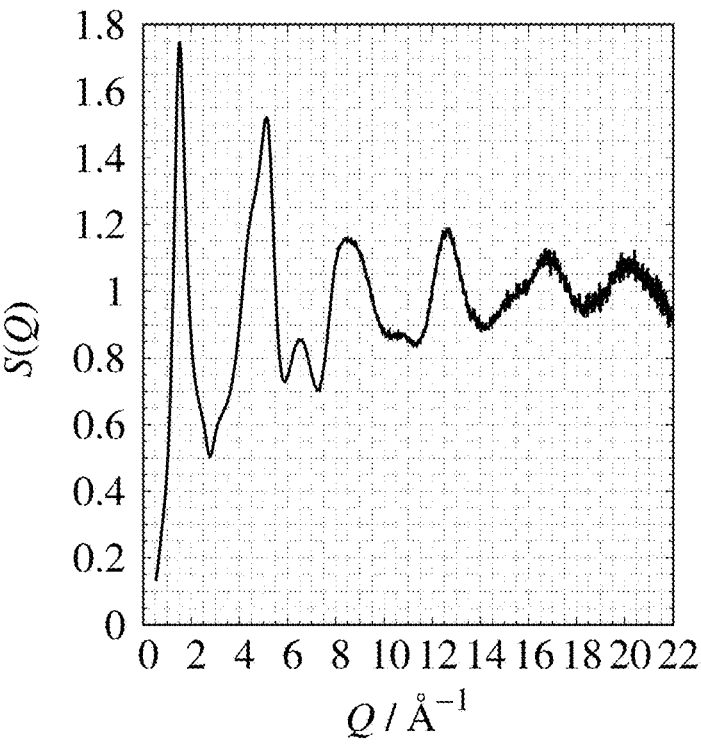
FIG. 3 is a graph showing one example of a structure factor S(Q).

Next, the structure factor S(Q) is calculated based on the total scattering data. In order to calculate the structure factor S(Q), it is to be calculated based on a type of a radiation source, a wavelength, a background, a shape of a sample, arrangement, kinds of constituent elements, a composition, an absorption coefficient, and so forth in the total scattering data. FIG. 3 is a graph showing one example of the structure factor S(Q). FIG. 3 shows a graph of the structure factor calculated from the total scattering data of FIG. 2.

Figure 4:
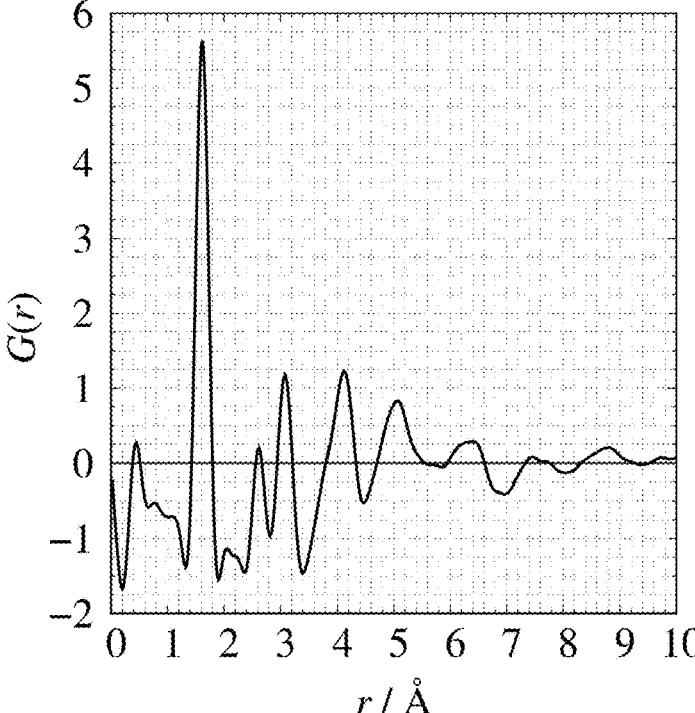
FIG. 4 is a graph showing one example of PDF G(r).

Next, PDF (Pair Distribution Function) G(r) is calculated from the structure factor S(Q). The minimum value $Q_{min}$ and the maximum value $Q_{max}$ of the structure factor S(Q) are acquired to carry out calculation of PDF G(r) with the following formula (8). $Q_{min}$ and $Q_{max}$ may be input by a user, though accompanying when calculating the structure factor S(Q). FIG. 4 is a graph showing one example of PDF G(r).

$$G(r) = \frac{2}{\pi} \int_{Q_{min}}^{Q_{max}} Q\{S(Q) - 1\} \sin Qr dQ \tag{8}$$

Figure 5:
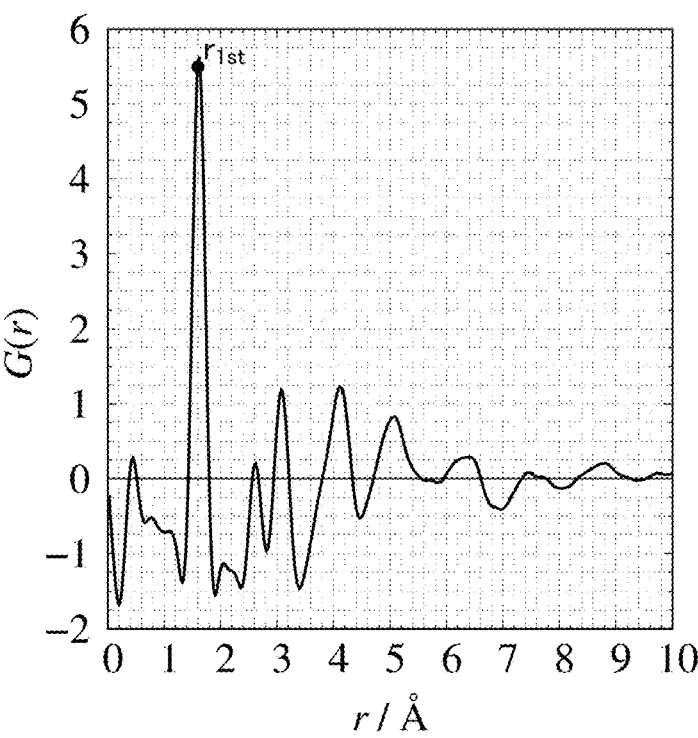
FIG. 5 is a graph showing a first peak position $r_{1st}$ of PDF in the graph of FIG. 4.

Next, the first peak position $r_{1st}$ of PDF G(r) is determined. The first peak position $r_{1st}$ of G(r) may be determined by a peak search of G(r), or be determined referring to a database or the like, based on the kind of a sample or the like. Further, $r_{1st}$ may be a value input by a user. In addition, $r_{1st}$ is unlikely to largely change with correction of the structure factor S(Q). Therefore, in some embodiments, $r_{1st}$ is made to be the same one as the first value without executing a peak search in the loop after the second time by executing a peak search only in the first loop to determine $r_{1st}$. The first correction function a(Q) and the second correction function b(Q) as after-mentioned can be prepared in the range set to calculated G(r) when executing the peak search to determine $r_{1st}$, and thus correction accuracy is highly enhanced. FIG. 5 is a graph showing a first peak position $r_{1st}$ of PDF in the graph of FIG. 4.

Next, a cut-off function Φ(r) is determined. The cut-off function Φ(r) is a function of cutting off data on a long distance side of PDF G(r). The cut-off function Φ(r) is a monotone decreasing function taking a value of from 1 to 0 in a domain thereof. A simple cut-off function Φ(r) is a step function. However, a noise is included in an actual PDF G(r), and thus the cut-off function Φ(r) may be a $C^{\infty}$ class monotone decreasing function taking a value of from 1 to 0 in a domain thereof. Accordingly, data of PDF G(r) obtained by cutting off the data on the long distance side can be smoothly connected. The cut-off function Φ(r) can be substituted by a sigmoid function, an exponentially expressed function, or the like.

The cut-off function Φ(r) can be set as a function such as for example, the following formula (9).

$$\phi(r) = \begin{cases} 1, & r \le R_{min} \\ \frac{1}{2}\left\{1 + \cos\left(\pi \frac{r - R_{min}}{R_{max} - R_{min}}\right)\right\}, & R_{min} < r \le R_{max} \\ 0, & R_{max} < r \end{cases} \quad (9)$$

In the formula (9), $R_{max}$ and $R_{min}$ each are determined, based on the structure factor S(Q) and PDF G(r). For example, it is determined as shown in the following formulae (10) to (12).

$$R_{min} = \begin{cases} 1.0\text{Å}, & r_{1st} - 6\Delta r < 1.0\text{Å} \\ r_{1st} - 6\Delta r, & r_{1st} - 6\Delta r \ge 1.0\text{Å} \end{cases} \quad (10)$$

$$R_{max} = \begin{cases} 1.0\text{Å}, & r_{1st} - \Delta r < 1.0\text{Å} \\ r_{1st} - \Delta r, & r_{1st} - \Delta r \ge 1.0\text{Å} \end{cases} \quad (11)$$

$$\Delta r = \pi/Q_{max} \quad (12)$$

Next, prepared are the first correction function a(Q) comprising a cut-off function Φ(r) and data of PDF G(r), that is Fourier-transformed in a predetermined range; and the second correction function b(Q) comprising the cut-off function Φ(r), that is Fourier-transformed in the predetermined range. At this time, the predetermined range may be from 0 to $r_{1st}$. In addition, when the first peak position $r_{1st}$ of G(r) is fixed to one value, the second correction function b(Q) is also fixed to one function.

Figure 6:
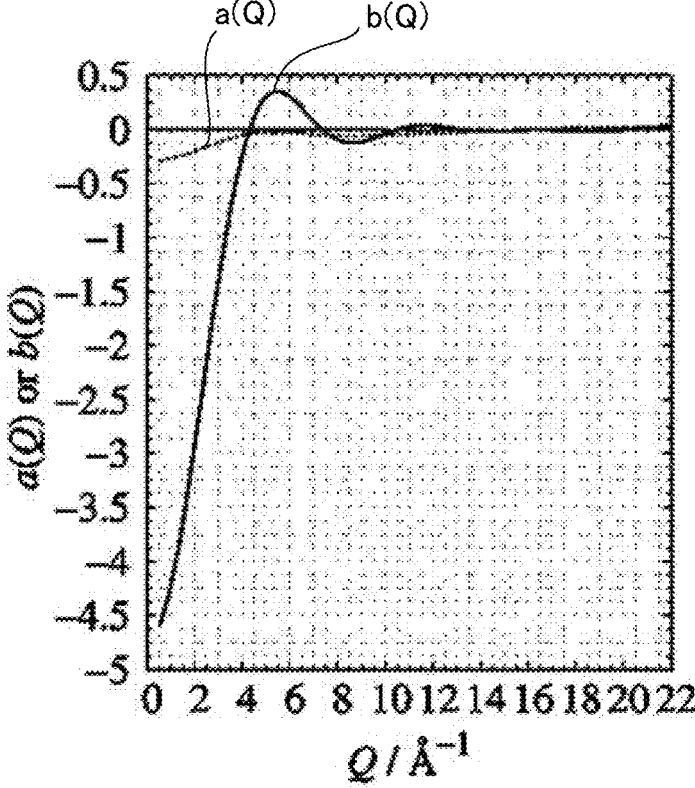
FIG. 6 is a graph showing one example of a first correction function a(Q) and a second correction function b(Q).

For example, a(Q) and b(Q) can be set as functions as shown in the following formulae (13) and (14), respectively. According to the formulae (13) and (14), G(r) represents PDF G(r) before correction in a loop thereof. FIG. 6 is a graph showing one example of a first correction function a(Q) and a second correction function b(Q). FIG. 6 shows graphs a(Q) and b(Q) when the first correction function a(Q) and the second correction function b(Q) are defined by the formulae (13) and (14), with respect to PDF G(r) of FIG. 4.

$$a(Q) = \int_0^{r_{1st}} \phi(r)G(r)\frac{\sin Qr}{Q}dr \quad (13)$$

$$b(Q) = -4\pi \int_0^{r_{1st}} \phi(r)r\frac{\sin Qr}{Q}dr \quad (14)$$

Density $\rho_0$ is calculated based on the first correction function a(Q) and the second correction function b(Q). The calculated $\rho_0$ is set to a scale factor when calculating the after-mentioned correction amount c(Q). According to a method of calculating $\rho_0$, for example, a least-squares method or the like is usable. When determining the density $\rho_0$ using the least-squares method, determination thereof can be made as shown in the following formula (15). In the formula (15), a $(Q_i)$ and b$(Q_i)$ represent values of the first correction function and the second correction function at each measurement point $Q_i$ of the structure factor.

$$\rho_0 = \frac{\sum_i (a(Q_i)b(Q_i))}{\sum_i (b(Q_i)^2)} \quad (15)$$

Figure 7:
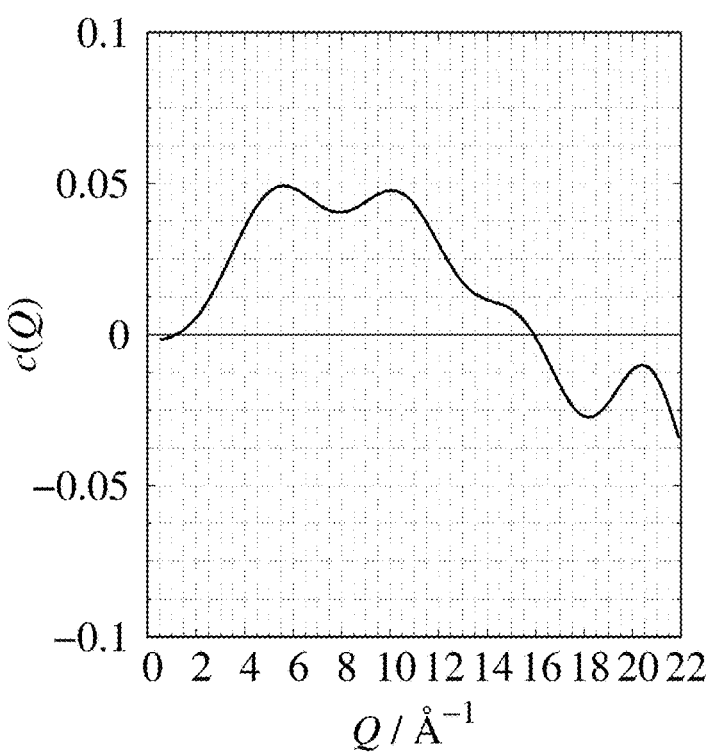
FIG. 7 is a graph showing one example of a correction amount c(Q).

Next, calculated is a correction amount c(Q) including the first correction function a(Q), the second correction function b(Q), and the scale factor ($\rho_0$ determined by those described above in the present embodiment). At this time, the scale factor in each loop is set as density $\rho_0$ determined every time as described above to correct and refine the calculated $\rho_0$. Further, in accompany therewith, the structure factor S(Q) can also be corrected. For example, c(Q) can be defined as a formula like the following formula (16). FIG. 7 is a graph showing one example of the correction amount c(Q). FIG. 7 shows a graph of c(Q) when the correction amount c(Q) is defined by the formula (16).

$$c(Q) = -a(Q) + \rho_0 b(Q) \quad (16)$$

Next, the structure factor S(Q) is corrected using the correction amount c(Q). The correction of the structure factor S (Q) can be made as shown in the following formula (17). In the formula (17), $S_{cor}$ (Q) represents the structure factor S(Q) after correction, and $S_{obs}$ (Q) represents the structure factor S(Q) before correction. That is, a function obtained by adding c (Q) to S (Q) is set as a new structure factor S (Q).

$$S_{cor}(Q) = S_{obs}(Q) + C(Q) \quad (17)$$

Next, calculated is an R-factor value comprising the first correction function a(Q) and the second correction function b(Q), that represents correction accuracy. In the present embodiment, the R-factor value indicates a change rate of the calculated density $\rho_0$. When the R-factor value is set as a value indicating the change rate of the calculated density $\rho_0$, for example, calculation can be made as shown in the following formula (18). In the formula (18), $\rho_0(j)$ represents the density $\rho_0$ calculated in the j-th loop. In addition, anything may be available as long as the R-factor value is a value indicating correction accuracy or a change rate of density, thereby not being limited to the formula (18).

$$R = \sqrt{\frac{(\rho_0(j-1) - \rho_0(j))^2}{\rho_0(j)^2}} \times 100 \quad (18)$$

Figure 8:
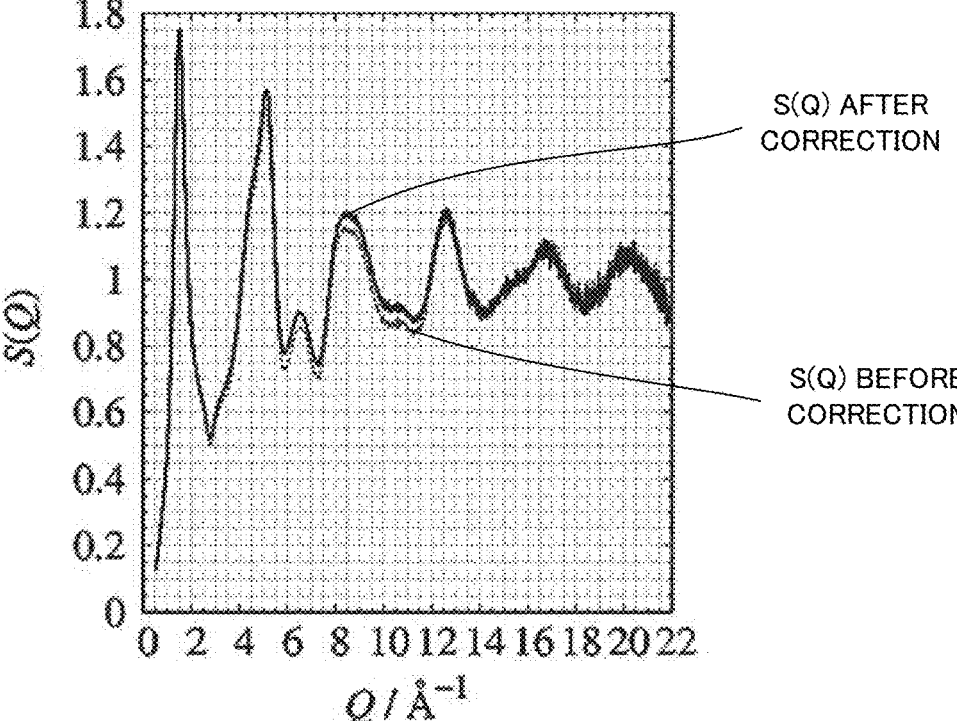
FIG. 8 is a graph showing one example of a structure factor S(Q) before correction, and a structure factor S(Q) after correction.

Then, when the condition set by the R-factor value is not satisfied, PDF G(r) is calculated from the corrected structure factor S(Q) again, and the processing up to calculation of the R-factor value is carried out again. On the other hand, when the condition set by the R-factor value is satisfied, the structure factor S(Q) corrected as necessary or the density $\rho_0$ is output, followed by ending. FIG. 8 is a graph showing one example of the structure factor S(Q) before correction, and the structure factor S(Q) after correction. In addition, the R-factor value setting condition, for example, can be generally set to a predetermined value of 0.05% or more and 1% or less. Further, for example, a predetermined value of 0.1% or more and 1% or less can be set when giving priority to the calculation speed. Further, for example, a predetermined value of 0.005% or more and 0.05% or less can be set when giving priority to density accuracy. In addition, there are some cases where according to the R-factor value, calculation thereof cannot be made by the first loop, or there is no comparison target, depending on the definition. In such cases, the configuration may be made so as to always do the second loop. The embodiment 2 and the embodiment 3 are similarly applied thereto.

In this manner, the method according to the present embodiment can correct the density $\rho_0$ while starting from the total scattering data to correct the structure factor S(Q).

Embodiment 2

A modified example of a method of correcting the structure factor while estimating the density using the total scattering data measured by an X-ray diffractometer is described in the embodiment 2. A lot of procedures are similar to those in the embodiment 1, and thus only different points are described.

According to the present embodiment, the same steps as those in the embodiment 1 can be carried out up to the step of preparing the first correction function a(Q) and the second correction function b(Q) It is also similar thereto that the structure factor S(Q) is set as the first data.

Figure 9:
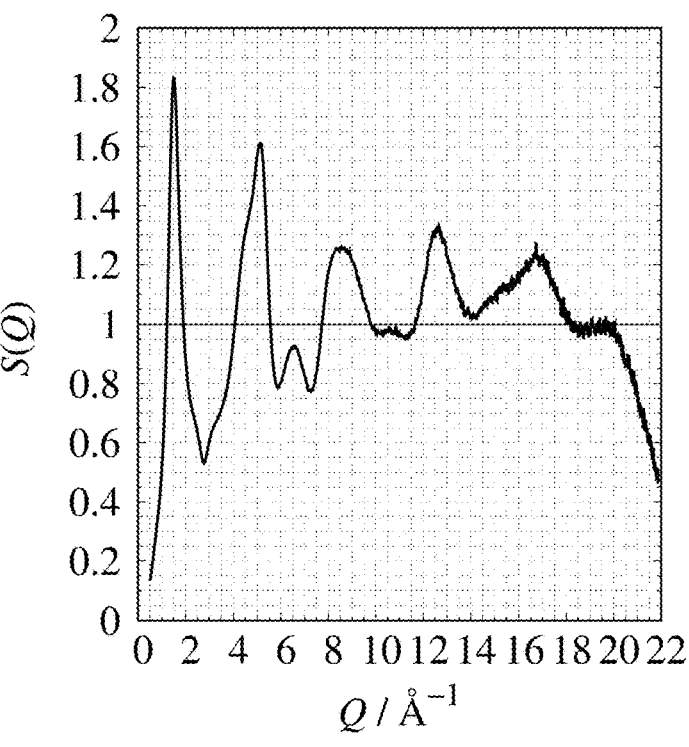
FIG. 9 is a graph showing one example of a structure factor S(Q).

Herein, assumed is a case where the calculated or acquired structure factor S(Q) contains a large distortion. FIG. 9 is a graph showing one example of the structure factor S(Q). FIG. 9 shows a structure factor S(Q) largely distorted on a side of a large value of Q. The cause of such a distortion is variously conceivable, but for example, there are a case of being derived from acquisition of insufficient Compton scattering intensity, and so forth.

When the structure factor S(Q) contains a large distortion, there are some cases where accuracy of the corrected density $\rho_0$ does not get any better when using the method according to the embodiment 1. The method according to the embodiment 1 assumes that a(Q)=$\rho_0$ b(Q) is satisfied in the end. This assumption means that the same density $\rho_0$ can be calculated at any point Q from a(Q) and b(Q) in the end. On the other hand, when the structure factor S(Q) contains a large distortion, the density $\rho_0$ calculated using the method according to the embodiment 1 is calculated as a value obtained by reflecting the distortion, and thus accuracy thereof does not get any better.

Herein, according the present embodiment, not only the density is calculated from values of a(Q) and b(Q) at all measurement points Q of the structure factor S(Q), but also the density is calculated so as to include a constraint term that attaches importance to data of a(Q) and b(Q) in the partially limited range, followed by making correction thereof. As shown in FIG. 9, when the structure factor S(Q)

is largely distorted in a high Q range, the limited range of a(Q) and b(Q) may be a range or a point in a low Q range.

First, a temporary density $\rho_0'$ is calculated based on the first correction function a(Q) and the second correction function b(Q). According to the method of calculating the temporary density $\rho_0'$, the same method as a method of calculating the density $\rho_0$ in the embodiment 1 is usable, and for example, a least-squares method or the like is usable. When the temporary density $\rho_0'$ is determined using the least-squares method, determination thereof is made as given in the following formula (19). In the formula (19), $a(Q_i)$ and $b(Q_i)$ represent values of the first correction function and the second correction function at each measurement point $Q_i$ of the structure factor.

$$\rho_0' = \frac{\sum_i (a(Q_i)b(Q_i))}{\sum_i (b(Q_i)^2)} \tag{19}$$

Figure 10:
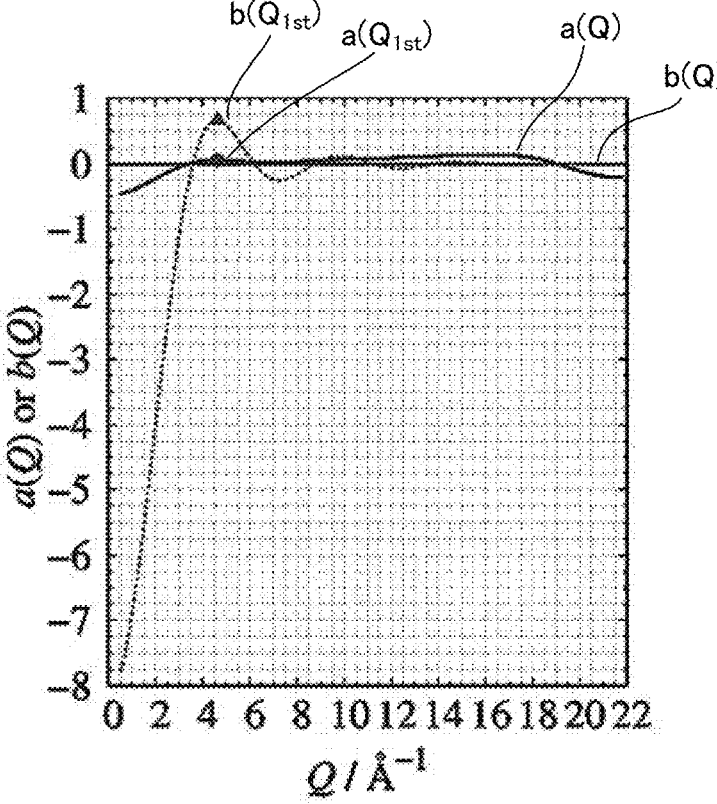
FIG. 10 is a graph showing one example of a first correction function a(Q) and a second correction function b(Q).

Next, calculated is the constraint term d that attaches importance to data of a(Q) and b(Q) in the limited range. When the limited range is set as a range or a point in a low Q region, for example, $Q_{1st}$ that provides the first maximal value of the second correction function b(Q) is determined. With respect to $Q_{1st}$ thereof, the constraint term d can be calculated from a $(Q_{1st})$ and $b(Q_{1st})$ as given in the following formula (20). FIG. 10 is a graph showing one example of the first correction function a(Q) and the second correction function b(Q). FIG. 10 shows positions of $a(Q_{1st})$ and $b(Q_{1st})$. In the formula (20), the constraint term d represents density estimated from a $(Q_{1st})$ and b $(Q_{1st})$.

$$d = \frac{a(Q_{1st})}{b(Q_{1st})} \tag{20}$$

In addition, since the constraint term d is a value for attaching importance to data of a(Q) and b(Q) in the limited range, anything may be available as long as it is a value indicating density estimated from a(Q) and b(Q) in the limited range of Q, or at a point thereof. For example, the calculated value may be represented by d by limiting $Q_i$ in the formula (19) to those included within a predetermined range.

Density $\rho_0$ is calculated based on the calculated temporary density $\rho_0'$ and the constraint term d. The calculated density $\rho_0$ is set as a scale factor when calculating a correction amount c(Q) similarly to the embodiment 1. The scale factor in each loop is set as density $\rho_0$ determined every time as described above to correct and refine the calculated $\rho_0$ while reducing influence of the distortion of the structure factor S(Q). Further, in accompany therewith, the structure factor S(Q) can also be corrected.

The density $\rho_0$ can be calculated as given in the following formula (21), for example. In the formula (21), an initial value of a ratio w at which a constraint term d is weighted can be arbitrarily set in the range of larger than 0 and less than 1. For example, the initial value of w is set to 0.5. The initial value of w may be a value input by a user. In addition, the method of calculating the density $\rho_0$ based on the temporary density $\rho_0'$ and the constraint term d is not limited to the formula (21).

$$\rho_0 = wd + (1-w)\rho_0' \tag{21}$$

Calculation of the correction amount c(Q), correction of the structure factor S(Q), and calculation of the R-factor value are similar to those in the embodiment 1, thereby being omitted. In the present embodiment as well, the R-factor value represents a change rate of the calculated density $\rho_0$.

The R-factor value in the j-th loop is represented by R(j) When the condition set by the R-factor value is not satisfied, a value of w is updated in such a manner that the value of w increases or decreases, according to increase/decrease of a value of R(j) with respect to a value of R(j−1). For example, when satisfying R(j)<R(j−1), the update is taken in such a manner as to satisfy $w_{old}<w_{new}$ by the original w being represented by $w_{old}$, and the updated w being represented by $w_{new}$. Further, When not satisfying R(j)<R(j−1), the update is taken in such a manner as to satisfy $w_{old}>w_{new}$.

When satisfying R(j)<R(j−1), the update of w can be taken as given in the following formula (22), using for example, a constant $p_1$ satisfying $0<p_1<1$. Further, when not satisfying R(j)<R(j−1), the update of w can be taken as given in the following formula (23), using for example, a constant $p_2$ satisfying $1<p_2$. The $p_1$ and $p_2$ may be given in advance. Further, they may be values input by a user. In addition, the method of updating w is not limited to those in the formula (22) and the formula (23), and for example, it may be a method of subtracting/adding a predetermined constant from/to w, or the like.

$$w_{new}=p_1w_{old} \tag{22}$$

$$w_{new}=p_2w_{old} \tag{23}$$

After updating w, PDF G(r) is calculated from the corrected structure factor S(Q) again, and the processing up to calculation of the R-factor value is carried out again. On the other hand, when the condition set by the R-factor value is satisfied, the structure factor S(Q) corrected as necessary or the density $\rho_0$ is output, followed by ending. The condition set by the R-factor value can be specified similarly to the embodiment 1.

Figure 11:
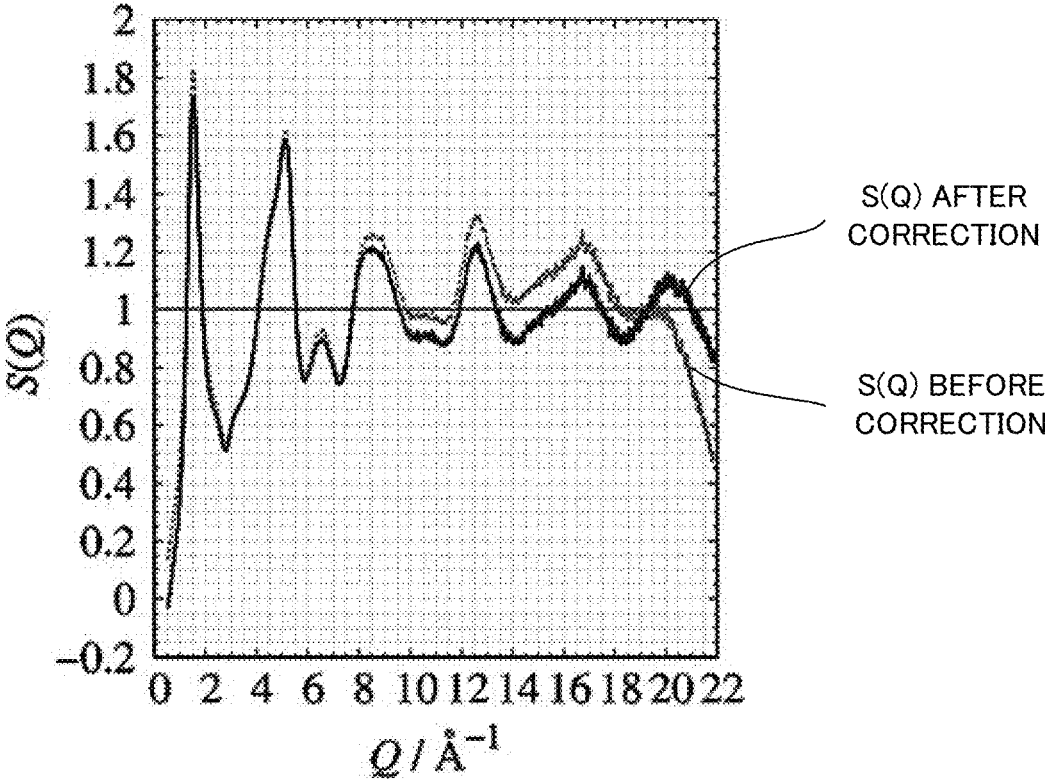
FIG. 11 is a graph showing one example of a structure factor S(Q) before correction, and a structure factor S(Q) after correction.

FIG. 11 is a graph showing one example of the structure factor S(Q) before correction, and the structure factor S(Q) after correction. As shown in FIG. 11, the method according to the present embodiment can appropriately correct a range including a large distortion of the structure factor S(Q). In addition, when a value of a ratio w is set to 0, and w is not updated, the method according to the present embodiment has had the same result as that of the method according to the embodiment 1, and thus it may be said that the present embodiment includes the embodiment 1.

In this manner, the method according to the present embodiment can correct the structure factor S(Q), and correct the density $\rho_0$ while that starting from the total scattering data, and reducing influence of distortion of the structure factor S(Q).

Embodiment 3

In the embodiment 3, described is a method of correcting the structure factor by assuming that the density is previously known, using the total scattering data measured by an X-ray diffractometer. A lot of procedures are similar to those in the embodiment 1, and thus only different points are described.

According to the present embodiment, the same steps as those in the embodiment 1 can be carried out up to the step of preparing the first correction function a (Q) and the second correction function b (Q) It is also similar thereto that the structure factor S(Q) can be set as a first data thereof.

In the present embodiment, it is assumed that the density of a sample is previously known, and thus there is no need to calculate the density $\rho_0$ based on the first correction function a(Q) and the second correction function b(Q). On the other hand, the scale factor when calculating the correction amount c(Q) is represented by a constant $\alpha$. This value $\alpha$ may be a predetermined value. The value $\alpha$ may be determined referring to a database or the like, based on the kind of a sample or the like, or be a value input by a user. In the method according to the present embodiment, the structure function can be corrected base on the density by setting the value $\alpha$ as a previously known density.

Next, calculated is the correction amount c(Q) including the first correction function a(Q), the second correction function b(Q) and the scale factor (constant $\alpha$ as given above in the present embodiment) For example, c(Q) can be defined as a formula as given in the following formula (24).

$$c(Q)=-a(Q)+ab(Q) \tag{24}$$

The scale factor in each loop is fixed as a constant $\alpha$, and thus the structure factor S(Q) can also be corrected based on $\alpha$ when correction thereof is made so as to bring a(Q) close to $\alpha b(Q)$. In addition, when the second function b(Q) is fixed to one function by fixing the first peak position $r_{1st}$ of G(r) to one value, it may be said that the correction amount c(Q) is a function variable with a change of the first correction function a(Q).

The correction of the structure factor S(Q) can be made by the same method as that of the embodiment 1. Next, calculated is the R-factor value representing correction accuracy, that includes the first correction function a(Q) and the second correction function b(Q). According to the present embodiment, the R-factor value is a value indicating a matching degree between a(Q) and $\alpha b(Q)$. When the R-factor value is set to the value indicating a matching degree between a(Q) and $\alpha b(Q)$, for example, it can be determined as given in the following formula (25). In the following formula (25), b' $(Q_i)$ represents $\alpha b(Q_i)$. Further, $a(Q_i)$ and $b(Q_i)$ represent respective values of the first correction function and the second correction function at each measurement point $Q_i$ of the structure factor. In addition, anything may be available as long as the R-factor value is a value indicating correction accuracy or a matching degree between a(Q) and b(Q), thereby not being limited to the formula (25).

$$R = \sqrt{\frac{\sum_i (a(Q_i) - b'(Q_i))^2}{\sum_i b'(Q_i)^2}} \times 100 \tag{25}$$

Then, when the condition set by the R-factor value is not satisfied, PDF G(r) is calculated from the corrected structure factor S(Q) again, and the processing up to calculation of the R-factor value is carried out again. On the other hand, when the condition set by the R-factor value is satisfied, the structure factor S(Q) corrected as necessary is output, followed by ending. In addition, in the present embodiment as well, the R-factor value setting condition, for example, can be generally set to a predetermined value of 0.05% or more and 1% or less. Further, for example, a predetermined value of 0.1% or more and 1% or less can be set when giving priority to the calculation speed. Further, for example, a predetermined value of 0.005% or more and 0.05% or less can be set when giving priority to density accuracy.

In this manner, in the method according to the present embodiment, the structure factor S(Q) can be corrected based on the scale factor by starting from the total scattering data.

[Whole System]

Figure 12:
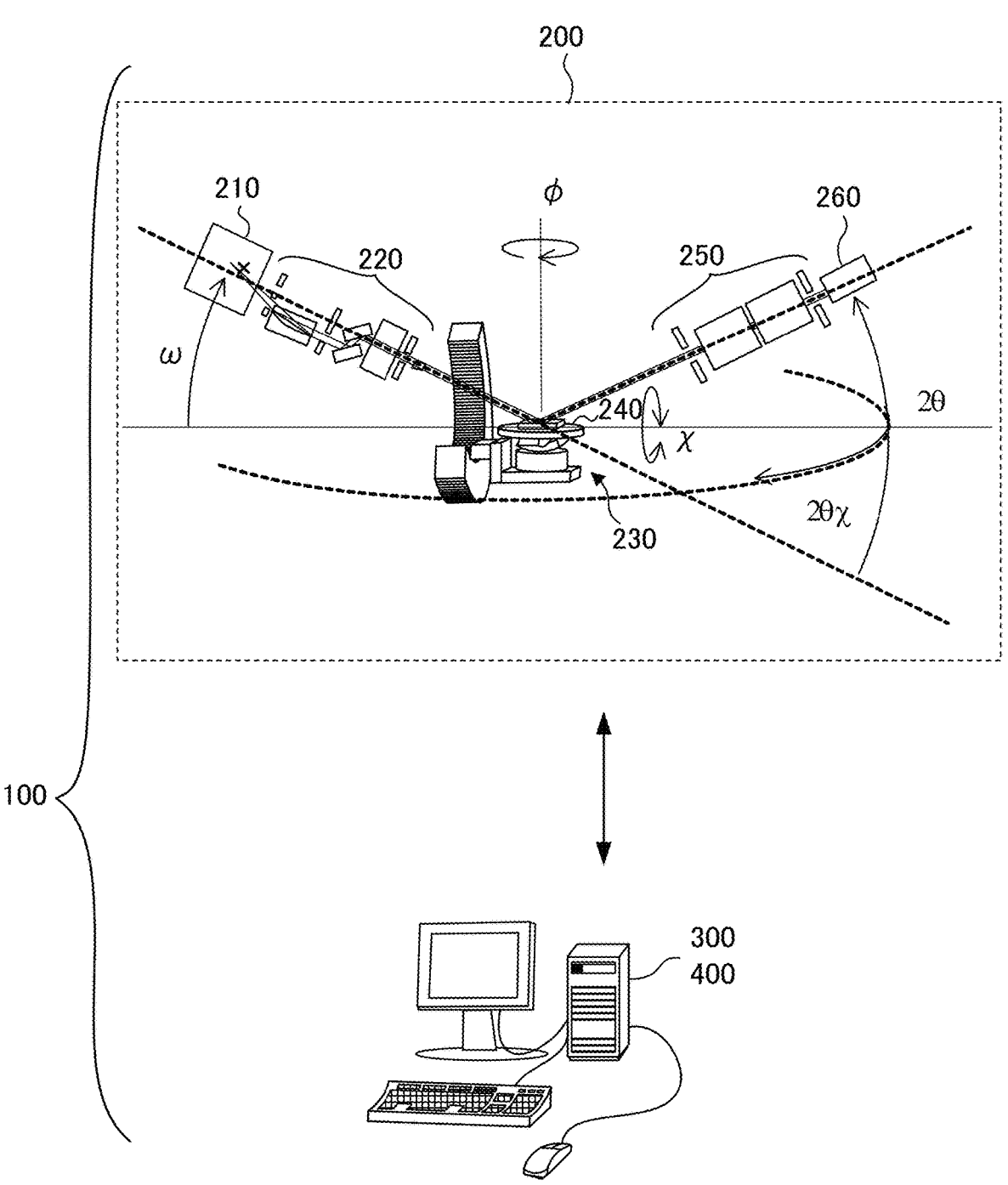
FIG. 12 is a conceptual diagram showing one example of a configuration of an X-ray diffraction measuring system.

FIG. 12 is a conceptual diagram showing one example of a configuration of an X-ray diffraction measuring system 100. The system 100 comprises an X-ray diffractometer 200, a control apparatus 300, and a correction apparatus 400. The X-ray diffractometer 200 that makes X-rays incident on a sample constitutes an optical system for detecting diffracted X-rays generated from the sample, and the optical system comprises a goniometer. In addition, the configuration shown in FIG. 12 is one example, and thus a variety of other configurations may be employed.

The control apparatus 300 connected to the X-ray diffractometer 200 controls the X-ray diffractometer 200 and processes acquired data, and performs storage thereof. The correction apparatus 400 corrects the structure factor. The control apparatus 300 and correction apparatus 400 each that are an apparatus comprising CPU and a memory may be a PC terminal, or be a server on a cloud. Not only the whole apparatus but also part of the apparatus or some functions of the apparatus may be provided on the cloud. The input device 510 that is for example, a keyboard and a mouse perform inputting to the control apparatus 300 and the correction apparatus 400. The display device 520 that is for example, a display displays the structure factor, PDF, or the like.

The structure factor calculated from the total scattering data can be corrected via measurement of the total scattering data by using such a system 100. Also, the density can be calculated and corrected.

In addition, in FIG. 12, the control apparatus 300 and the correction apparatus 400 are shown as an identical PC to each other. However, as described above, the method according to the present disclosure is possible to acquire and correct the total scattering data or the structure factor irrelevantly to the X-ray diffractometer 200 and the control apparatus 300, and thus the correction apparatus 400 may be constituted as an apparatus that is different from the control apparatus 300. The case where the control apparatus 300 and the correction apparatus 400 are constituted as different apparatuses from each other is described as follows.

[X-Ray Diffractometer]

The X-ray diffractometer 200 comprises an X-ray generation section 210 that generates X-rays from an X-ray focus, that is, an X-ray source; an incident side optical unit 220; a goniometer 230; a sample table 240 where a sample is set; an emitting side optical unit 250; and a detector 260 that detects X-rays. The X-ray generation section 210, the incident side optical unit 220, the goniometer 230, the sample table 240, the emitting side optical unit 250, and the detector 260 each constituting the X-ray diffractometer 200 may be those generally available, and thus descriptions are omitted.

[Control Apparatus]

Figure 13:
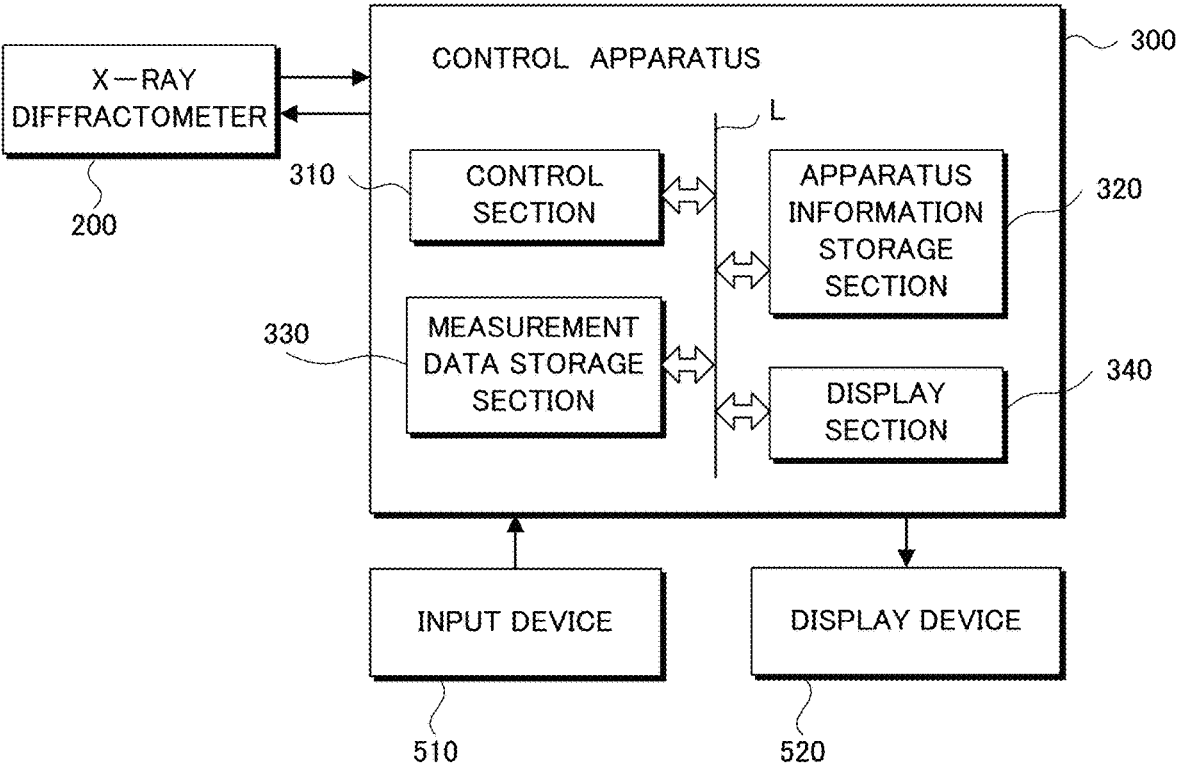
FIG. 13 is a block diagram showing one example of a configuration of a control apparatus.

FIG. 13 is a block diagram showing one example of a configuration of the control apparatus 300. The control apparatus 300 is constituted from a computer formed by connecting CPU (Central Processing Unit/Central Processor), ROM (Read Only Memory), RAM (Random Access Memory) and a memory to a bus. The control apparatus 300 is connected to the X-ray diffractometer 200 to receive information.

The control apparatus 300 comprises the control section 310, the apparatus information storage section 320, the measurement data storage section 330, and the display section 340. Each section can transmit/receive information with a control bus L. The input device 510 and the display device 520 are connected to CPU via an appropriate interface.

The control section 310 controls an operation of the X-ray diffractometer 200. The apparatus information storage section 320 stores apparatus information acquired from the X-ray diffractometer 200. The apparatus information includes information about the X-ray diffractometer 200 such as name of the apparatus, the kind of a radiation source, a wavelength, a background, and so forth. In addition, may be included information necessary for calculating the structure factor based on the total scattering data such as a shape of a sample, arrangement, kinds of constituent elements, a composition, an absorption coefficient and so forth.

The measurement data storage section 330 stores the measurement data acquired from the X-ray diffractometer 200. The measurement data includes the total scattering data. Together with the total scattering data, may be included the information required for calculating the structure factor based on the total scattering data such as the kind of a radiation source, a wavelength, a background, a shape of a sample, arrangement, kinds of constituent elements, a composition, an absorption coefficient and so forth. In addition, when the background is low, the information required for calculating the structure factor may not include the background. The display section 340 displays the measurement data on the display device 520. Thus, the measurement data can be confirmed by a user. Further, instruction and designation to the control apparatus 300, the correction apparatus 400 and so forth can be made based on the measurement data by the user.

[Correction Apparatus]

Figure 14:
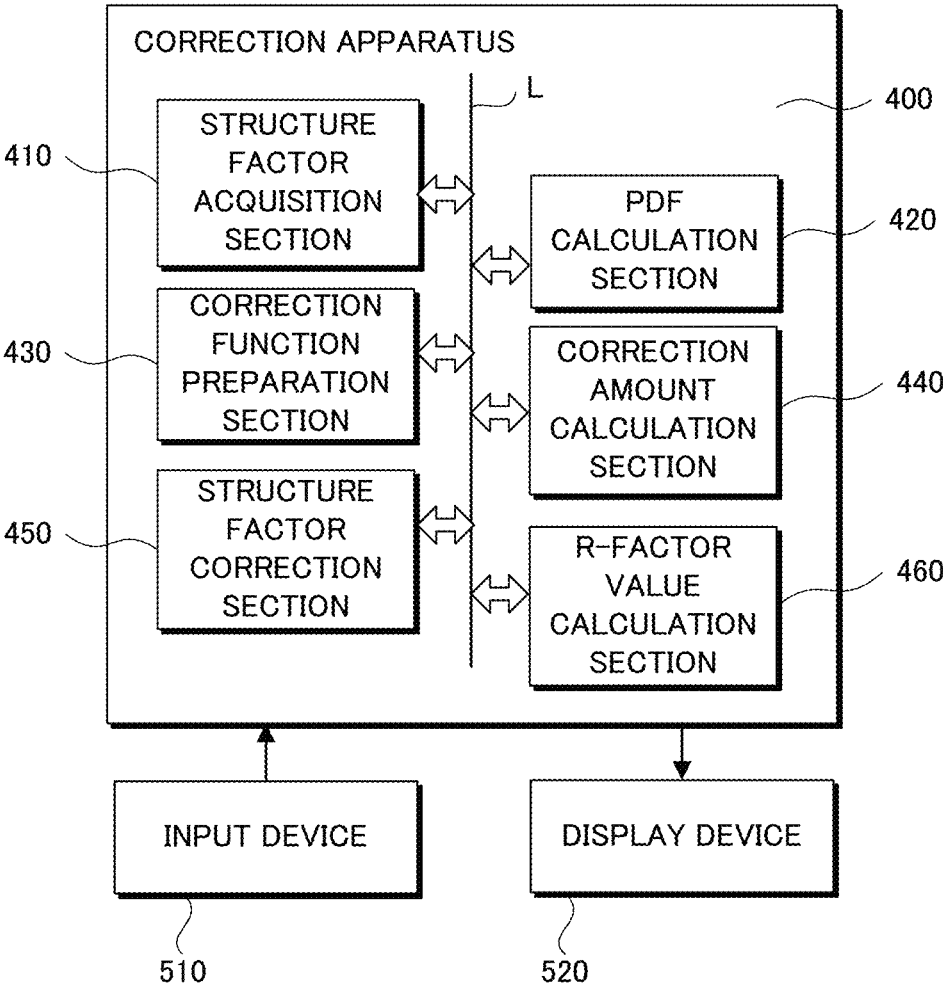
FIG. 14 is a block diagram showing one example of a configuration of a correction apparatus.

FIG. 14 is a block diagram showing one example of a configuration of the correction apparatus 400. The correction apparatus 400 is constituted from a computer formed by connecting CPU, ROM, RAM and a memory to a bus. The correction apparatus 400 may be connected to the X-ray diffractometer 200 via the control apparatus 300.

The correction apparatus 400 comprises the structure factor acquisition section 410, PDF calculation section 420, the correction function preparation section 430, the correction amount calculation section 440, the structure factor correction section 450, and the R-factor value calculation section 460. Each section transmits/receives information with the control bus L. The input device 510 and the display device 520 are also connected to CPU of the correction apparatus 400 via an appropriate interface when the correction apparatus 400 and the control apparatus 300 are included in another configuration. In this case, the input device 510 and the display device 520 each may differ from one connected to the control apparatus 300.

The structure factor acquisition section 410 acquires the structure factor calculated from the total scattering data. The structure factor acquisition section 410 may acquire the structure factor based on the total scattering data acquired directly from the X-ray diffractometer, or via the control apparatus 300; and may acquire the structure factor previously stored in a database or the like.

The PDF calculation section 420 calculates PDF (Pair Distribution Function) from the structure factor acquired by the structure factor acquisition section 410.

The correction function preparation section 430 prepares the first correction function and the second correction function. The first correction function comprising a cut-off function for cutting off data of PDF calculated by the PDF calculation section and data on a long distance side of PDF is a function Fourier-transformed in a predetermined range. Further, the second correction function comprising the cut-off function identical to the first correction function is a function Fourier-transformed in the predetermined range identical to that of the first correction function. The cut-off function is previously stored. Alternatively, a user may form an arbitrarily settable configuration by selecting a functional form, the predetermined range, and so forth.

The cut-off function is a monotone decreasing function taking a value of from 1 to 0 in a domain thereof. The cut-off function may be a $C^\infty$ class monotone decreasing function taking a value of from 1 to 0 in the domain of the cut-off function. Thus, the data of PDF can be smoothly connected. The cut-off function is possible to be substituted by a sigmoid function, a function expressed by an exponential form, or the like.

The correction amount calculation section 440 calculates a correction amount comprising the first correction function, the second correction function and the scale factor that are prepared by the correction function preparation section 430.

The structure factor correction section 450 corrects the structure factor using the correction amount calculated by the correction amount calculation section 440.

The R-factor value calculation section 460 calculates an R-factor value indicating correction accuracy, the R-factor value comprising the first correction function and the second correction function. The R-factor value may be a value indicating a matching degree between the first correction function and the second correction function. In addition, there are some cases where as to the R-factor value, calculation thereof cannot be made by the first loop, or there is no comparison target, depending on the definition. In such cases, it may be constituted to always do the second loop. Further, when there is provided a configuration in which the correction apparatus 400 comprises the after-mentioned density calculation section 435, and the R-factor value indicates a change rate of the density, the density estimated depending on the sample can be used as data for calculating the R-factor value in the first loop, or a comparison target. Further, the density calculated by the density calculation section 435 can be used as data for calculating the R-factor value in the loop after the second time, or a comparison target. The estimated density may be those input by a user.

Figure 15:
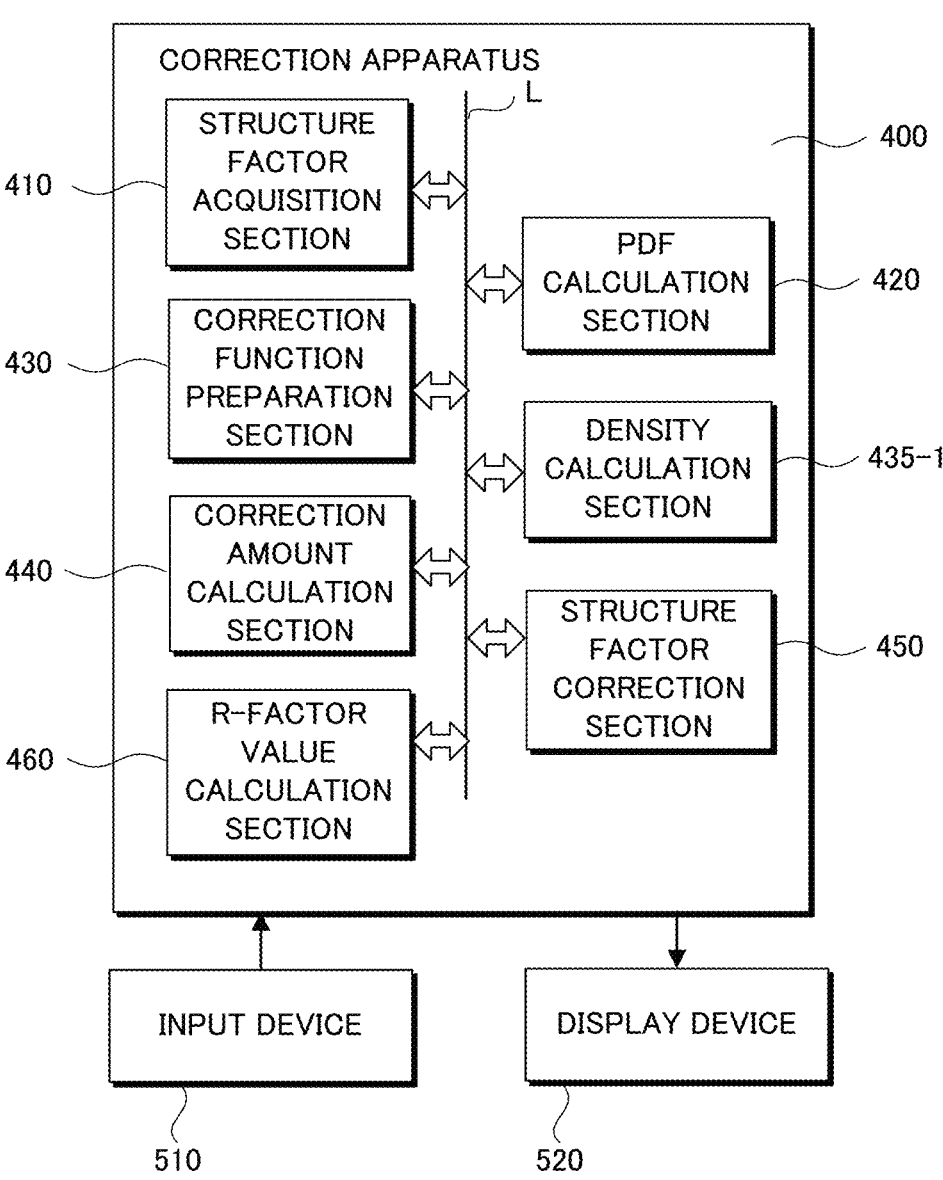
FIG. 15 is a block diagram showing a modified example of a configuration of a correction apparatus.
Figure 16:
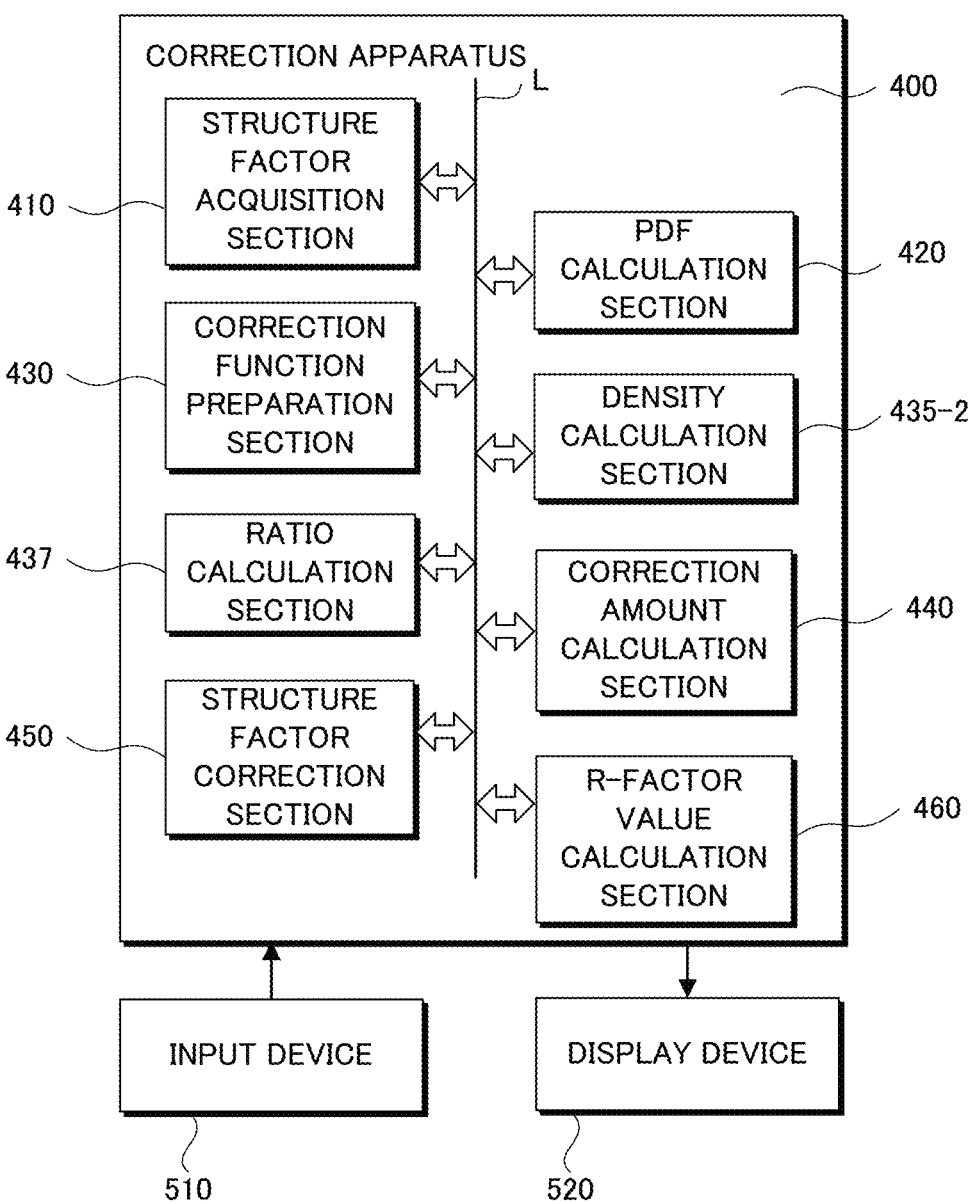
FIG. 16 is a block diagram showing a modified example of a configuration of a correction apparatus.
Figure 17:
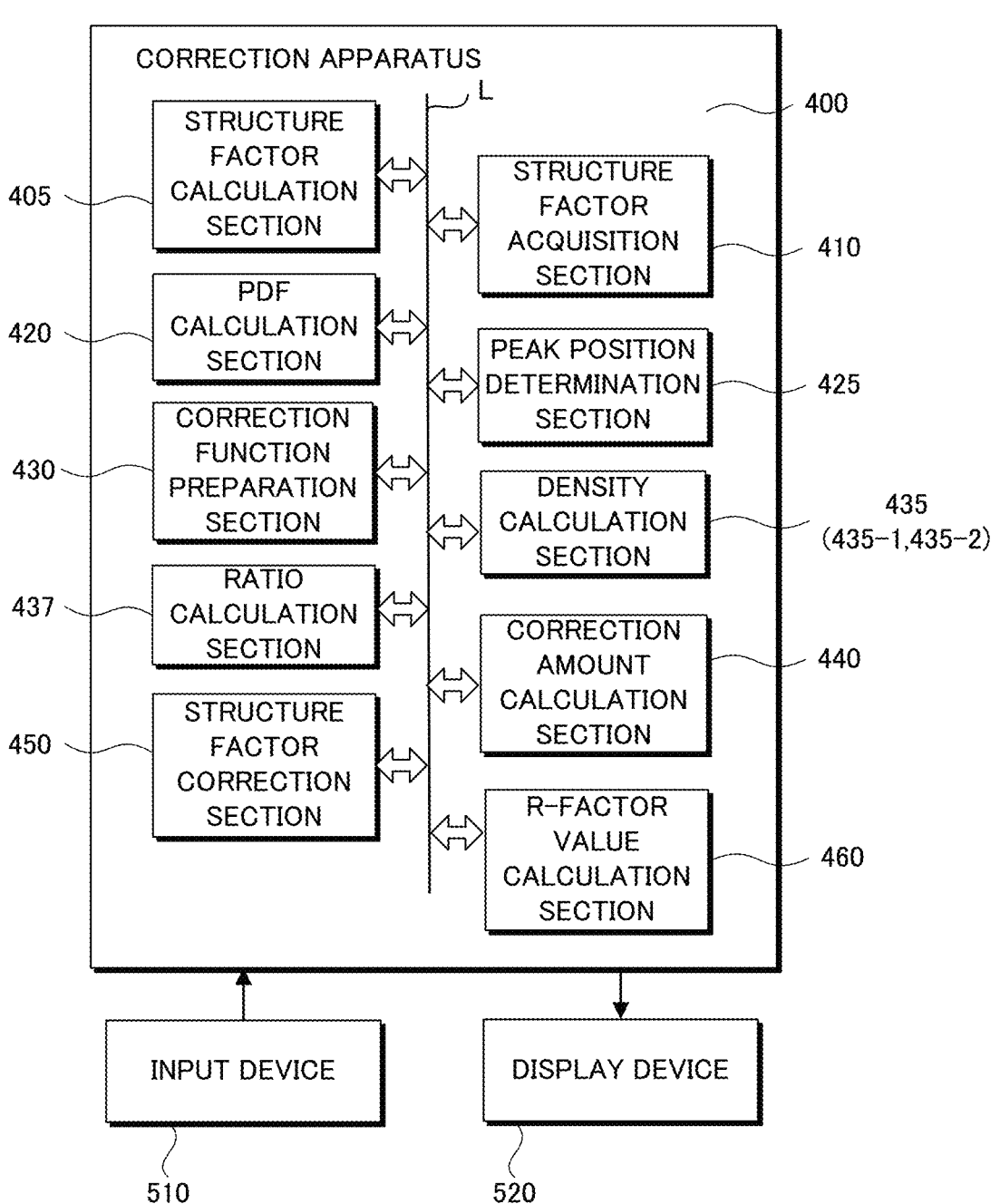
FIG. 17 is a block diagram showing a modified example of a configuration of a correction apparatus.

FIGS. 15, 16 and 17 each are a block diagram showing a modified example of a configuration of the correction apparatus 400. As shown in FIGS. 15 to 17, in some embodiments, the correction apparatus 400 comprises the density calculation section 435 (density calculation section 435-1 or density calculation section 435-2). The density calculation section 435-1 calculates the density based on the first correction function and the second correction function. Thus, based on the first correction function and the second correction function, the correction apparatus 400 can correct the density calculated based on the structure factor.

The density calculation section 435-2 calculates the constraint term based on a value of each of the first correction function and the second correction function in a limited range. The density calculation section 435-2 calculates the density based on the first correction function, the second correction function and the constraint term. Thus, the correction apparatus 400 can correct the density calculated from the structure factor based on the first correction function, the second correction function and the constraint term. In this case, the calculated density may comprise a product of the constraint term and a ratio at which the constraint term is weighted.

In the configuration where the correction apparatus 400 comprises the density calculation section 435-2, as shown in FIGS. 16 and 17, the correction apparatus 400 may comprise the ratio calculation section 437. The ratio calculation section 437 calculates or updates the ratio w at which the constraint term is weighed. The R-factor value in the j-th loop is represented by R(j). The ratio calculation section 437 may update the value of w in such a manner the value of w increases or decreases, according to increase/decrease of the value of R(j) with respect to the value of R(j−1). Thus, a degree of involvement to density calculation of the constraint term can be changed. Updating the value of the ratio may be carried out when the condition set by the R-factor value is not satisfied. In FIG. 17, when the density calculation section 435 is the density calculation section 435-1 without using the constraint term, the correction apparatus 400 may not include the ratio calculation section 437.

In the configuration where the correction apparatus 400 comprises the density calculation section 435 (density calculation section 435-1 or density calculation section 435-2), the R-factor value calculated by the R-factor value calculation section 460 may indicate a change rate of the density calculated by the density calculation section 435. Thus, accuracy of the density calculated by the density calculation section 435 can be highly enhanced.

As shown in FIG. 17, in some embodiments, the correction apparatus 400 comprises the structure factor calculation section 405. The structure factor calculation section 405 calculates the structure factor based on a type of a radiation source, a wavelength, a background, a shape of a sample, arrangement, kinds of constituent elements, a composition, and an absorption coefficient in the total scattering data by acquiring the total scattering data of a sample. In addition, when the background is low, the structure factor may be calculated without using the foregoing. At this time, the structure factor acquisition section 410 acquires the structure factor calculated by the structure factor calculation section 405. Thus, the correction apparatus 400 can correct the structure factor by calculating the structure factor based on the total scattering data of the sample.

As shown in FIG. 17, in some embodiments, the correction apparatus 400 comprises the peak position determination section 425. The peak position determination section 425 determines the first peak position $r_{1st}$ of PDF. At this time, a predetermined range can be set to a range between 0 and $r_{1st}$. Thus, the predetermined range can be determined according to PDF calculated by the PDF calculation section 420, and accuracy of the first correction function and the second correction function each prepared by the correction function preparation section 430 can be highly enhanced.

[Measurement Method]

A sample S is placed in the X-ray diffractometer 200, and the movement of a rotational axis and the projection of X-rays are repeated in the predetermined condition, based on controlling of the control apparatus 300. In this manner, the sample is irradiated with X-rays to acquire the diffraction data. The X-ray diffractometer 200 transmits apparatus information, etc. and the acquired diffraction data as measurement data to the control apparatus 300.

[Correction Method]

(Description Concerning the Flow when Correcting Only the Structure Factor)

Figure 18:
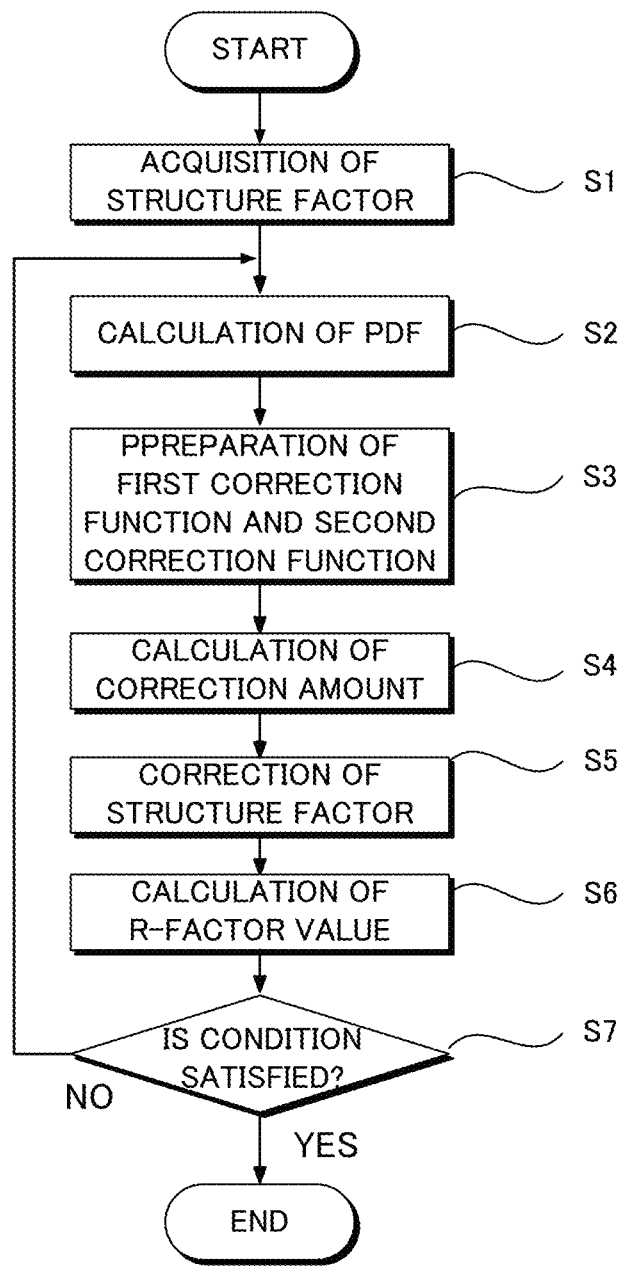
FIG. 18 is a flowchart showing one example of an operation of a correction apparatus.

FIG. 18 is a flowchart showing one example of an operation of the correction apparatus 400. FIG. 18 shows one example of the operation when correcting only the structure factor. First, the correction apparatus 400 acquires the structure factor (Step S1). Next, PDF (Pair Distribution Function) is calculated from the acquired structure factor (Step S2). Next, a first correction function that is Fourier-transformed in a predetermined range, and a second correction function that is Fourier-transformed in the predetermined range, the first correction function comprising data of the PDF and a cut-off function for cutting off data on a long distance side of the PDF, and the second correction function comprising the cut-off function are prepared (Step S3).

Next, a correction amount comprising the first correction function, the second correction function, and the scale factor is calculated (Step S4). Next, the structure factor is corrected using the correction amount (Step S5). Next, an R-factor value indicating correction accuracy, the R-factor value comprising the first correction function and the second correction function is calculated (Step S6).

Then, when the condition set by the R-factor value is not satisfied (Step S7—NO), PDF is calculated from the corrected structure factor to perform processing up to Step S6 again after returning to Step S2. On the other hand, when the condition set by the R-factor value is satisfied (Step S7—YES), the corrected structure factor is output as necessary, followed by ending. In addition, there are some cases where according to the R-factor value, calculation thereof cannot be made by the first loop, or there is no comparison target, depending on the definition. In such cases, the configuration may be made so as to always do the second loop. Thus, the structure factor can be corrected based on the scale factor.

(Description Concerning the Flow when Calculating Density)

Figure 19:
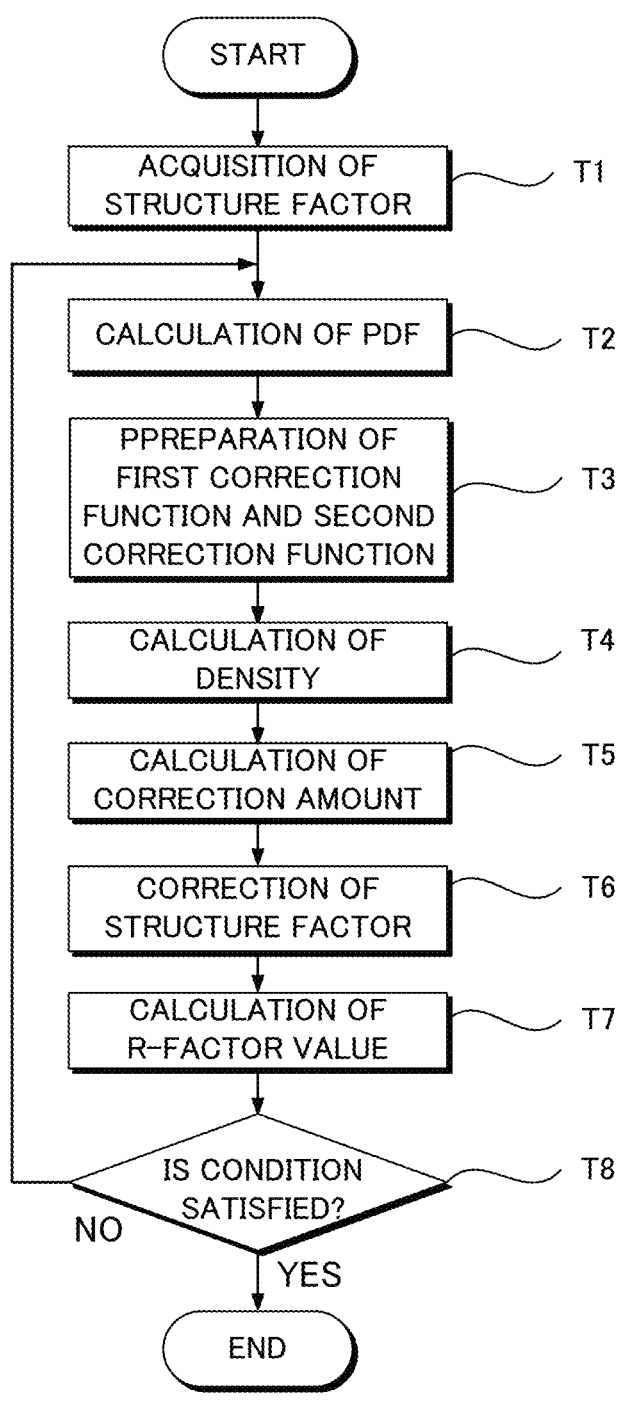
FIG. 19 is a flowchart showing a modified example of an operation of a correction apparatus.

FIG. 19 is a flowchart showing a modified example of an operation of the correction apparatus 400. FIG. 19 shows one example of the operation when not only the structure factor is corrected, but also the density is calculated. First, the correction apparatus 400 acquires the structure factor (Step T1). Next, PDF is calculated from the acquired structure factor (Step T2).

Next, a first correction function that is Fourier-transformed in a predetermined range, and a second correction function that is Fourier-transformed in the predetermined range, the first correction function comprising data of the PDF and a cut-off function for cutting off data on a long distance side of the PDF, and the second correction function comprising the cut-off function are prepared (Step T3).

Next, density is calculated using the first correction function and the second correction function (Step T4). Next, a correction amount comprising the first correction function, the second correction function, and the scale factor is calculated (Step T5). At this time, the scale factor may be set as density calculated by the density calculation section 435-1. Next, the correction factor is corrected using the correction amount (Step T6). Next, an R-factor value indicating correction accuracy, the R-factor value comprising the first correction function and the second correction function is calculated (Step T7). At this time, the R-factor value may indicate a change rate of the calculated density.

Then, when the condition set by the R-factor value is not satisfied (Step T8—NO), PDF is calculated from the corrected structure factor to perform processing up to Step T7 again after returning to Step T2. On the other hand, when the condition set by the R-factor value is satisfied (Step T8—YES), the corrected structure factor or density is output as necessary, followed by ending. In addition, when the R-factor value indicates a change rate of the calculated density, there are some cases where calculation thereof cannot be made by the first loop, or there is no comparison target. In such cases, it may be constituted to always do the second loop. Further, the density estimated according to the sample and the value input by a user each may be set as data for calculating the R-factor value, or may be set as a comparison target. Thus, not only the structure factor is corrected, but also the density can be corrected.

Description Concerning the Flow of a Modified Example when Calculating Density

Figure 20:
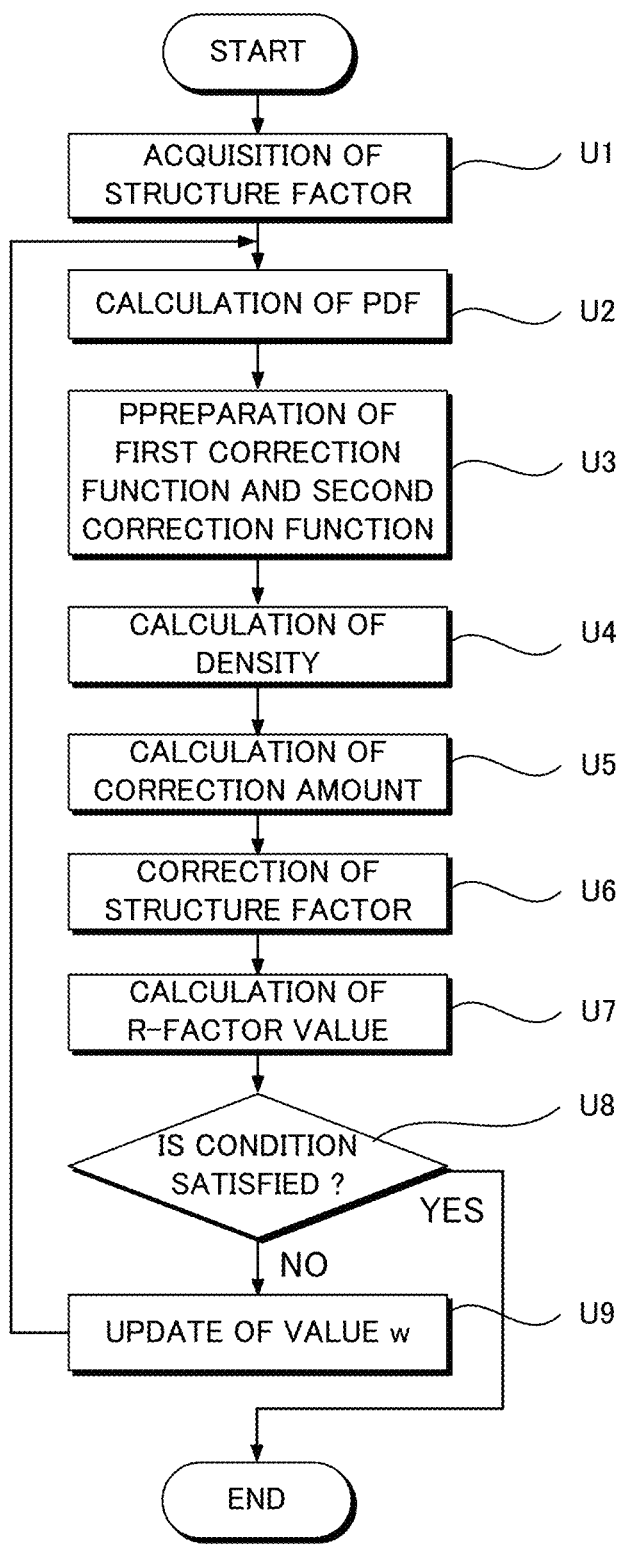
FIG. 20 is a flowchart showing a modified example of an operation of a correction apparatus.

FIG. 20 is a flowchart showing a modified example of an operation of the correction apparatus 400. When the structure factor contains large distortion, FIG. 20 shows one example of the operation when not only the structure factor is corrected, but also the density is calculated. First, the correction apparatus 400 acquires the structure factor (Step U1). Next, PDF is calculated from the acquired structure factor (Step U2).

Next, a first correction function that is Fourier-transformed in a predetermined range, and a second correction function that is Fourier-transformed in the predetermined range, the first correction function comprising data of the PDF and a cut-off function for cutting off data on a long distance side of the PDF, and the second correction function comprising the cut-off function are prepared (Step U3).

Next, the constraint term is calculated using the limited range of each of the first correction function and the second correction function, or the value of a point thereof. Next, the density is calculated based on the first correction function, the second correction function and the constraint term (Step U4). The calculated density may comprise a product of the constraint term and the ratio w at which the constraint term is weighted.

Next, the correction amount comprising the first correction function, the second correction function, and scale factor is calculated (Step U5). At this time, the scale factor may be set as density calculated by the density calculation section 435-2. Next, the structure factor is corrected using the correction amount (Step U6). Next, an R-factor value indicating correction accuracy, the R-factor value comprising the first correction function and the second correction function is calculated (Step U7). At this time, the R-factor value may indicate a change rate of the calculated density.

Next, when the condition set by the R-factor value is not satisfied (Step U8—NO), a value of w is updated (Step U9). The value of w may be updated by increasing or decreasing the value of w according to increase/decrease of the R-factor value. Then, PDF is calculated from the corrected structure factor to perform processing up to Step U7 again after returning to Step U2.

On the other hand, when the condition set by the R-factor value is satisfied (Step U8—YES), the structure factor corrected as necessary or the density is output, followed by ending. In addition, when the R-factor value indicates a change rate of the calculated density, there are some cases where as to the R-factor value, calculation thereof cannot be made by the first loop, or there is no comparison target. In such cases, it may be constituted to always do the second loop. Further, the density estimated according to the sample and the value input by a user each may be set as data for calculating the R-factor value, or may be set as a comparison target. Thus, not only the structure factor is corrected but also the density can be corrected, while reducing the influence of distortion of the structure factor.

Description Concerning the Flow of a Modified Example when Calculating Density

Figure 21:
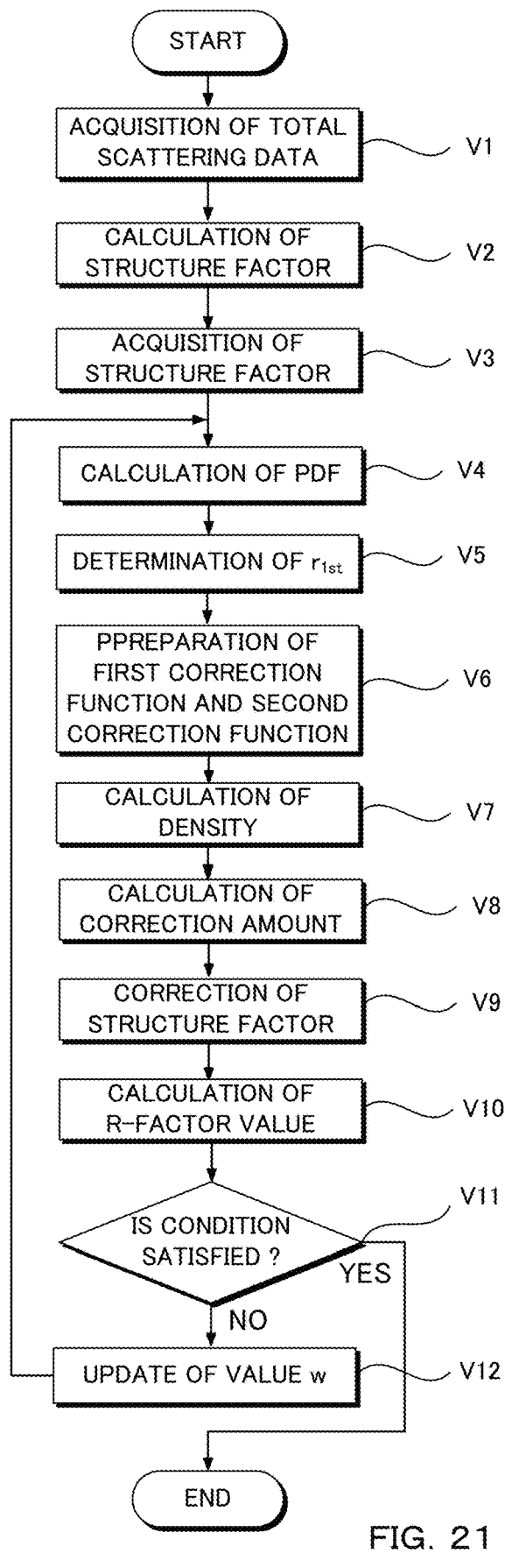
FIG. 21 is a flowchart showing a modified example of an operation of a correction apparatus.

FIG. 21 is a flowchart showing a modified example of an operation of the correction apparatus 400. FIG. 21 shows the modified example of the operation when not only the structure factor is corrected, but also the density is calculated. First, the correction apparatus 400 acquires the total scattering data (Step V1). Next, the structure factor is calculated from the acquired total scattering data (Step V2). At this time, the structure factor may be calculated based on a type of a radiation source, a wavelength, a background, a shape of a sample, arrangement, kinds of constituent elements, a composition, and an absorption coefficient in the total scattering data.

Next, the structure factor is acquired (Step V3). Next, PDF is calculated from the acquired structure factor (Step V4). Next, the first peak position $r_{1st}$ of PDF is determined (Step V5). The first peak position $r_{1st}$ of PDF may be determined by a peak search of PDF, or be determined referring to a database or the like. Further, the $r_{1st}$ may be one input by a user.

Next, a first correction function that is Fourier-transformed in a predetermined range, and a second correction function that is Fourier-transformed in the predetermined range, the first correction function comprising data of the PDF and a cut-off function for cutting off data on a long distance side of the PDF, and the second correction function comprising the cut-off function are prepared (Step V6). At this time, the predetermined range may be from 0 to $r_{1st}$.

Next, density is calculated using the first correction function and the second correction function (Step V7). Next, a correction amount comprising the first correction function, the second correction function, and the scale factor is calculated (Step V8). At this time, the scale factor may be set as density calculated by the density calculation section 435-1 or the density calculation section 435-2. Next, the correction factor is corrected using the correction amount (Step V9). Next, an R-factor value indicating correction accuracy, the R-factor value comprising the first correction function and the second correction function is calculated (Step V10). At this time, the R-factor value may indicate a change rate of the calculated density.

Then, when the condition set by the R-factor value is not satisfied (Step V11—No), a value of a ratio w at which a constraint term is weighted is updated (Step V12). The value of w may be updated by increasing or decreasing the value of w according to increase/decrease of the R-factor value. Then, PDF is calculated from the corrected structure factor to perform processing up to Step V10 again after returning to Step V4. In addition, when the scale factor is set as density including no constraint term, the value of w may not be updated with the value of w as 0. On the other hand, when the condition set by the R-factor value is satisfied (Step V11—YES), the corrected structure factor or density is output as necessary, followed by ending. In addition, when the R-factor value indicates a change rate of the calculated density, there are some cases where calculation thereof cannot be made by the first loop, or there is no comparison target. In such cases, it may be constituted to always do the second loop. Further, the density estimated according to the sample and the value input by a user each may be set as data for calculating the R-factor value, or may be set as a comparison target. Thus, not only the structure factor is corrected but also the density can be corrected, while reducing the influence of distortion of the structure factor, by starting from the total scattering data.

The step of acquiring the total scattering data, the step of calculating the structure factor from the total scattering data, and the step of determining the first peak position $r_{1st}$ of PDF each can also be applied to a method of correcting only the structure factor, or a method of correcting the structure factor and the density without using the constraint term.

Example 1

The system 100 constituted as described above is used to measure the total scattering data of $SiO_2$ glass. The structure factor and PDF are calculated using the foregoing. Then, density of the average number of atoms is calculated using the method of the embodiment 1 according to the present disclosure. The value is 0.06376 atoms/$A^3$. In addition, the R-factor value when reaching this value is 0.01% or less. Further, the loop repetition is eleven times.

The density of the average number of atoms is calculated from a slope obtained by linearly approximating data less than the first peak position $r_{1st}$ of PDF using a conventional method, with respect to the same PDF. The value is 0.05995 atoms/$A^3$. On the other hand, when calculating the density of the average number of atoms of a bulk body, it is 0.06613 atoms/$A^3$.

Therefore, it is confirmed that the density of the average number of atoms that is calculated by the method according to the present disclosure is closer to actual density of the average number of atoms than density of the average number of atoms that is calculated by the conventional method. In addition, when conversion is made from the above-described density of the average number of atoms (atoms/$A^3$) into normal density (g/$cm^3$), these are 2.12 g/$cm^3$, 1.99 g/$cm^3$ and 2.20 g/$cm^3$, respectively.

Example 2

Next, the total scattering data of glassy carbon, graphite, silicon, diamond, $LiMn_2O_4$ and $LiCoO_2$ is measured using the above-described system 100. The structure factor and PDF of each of the samples are calculated using these. Then, the density of the average number of atoms of each of the samples is calculated using the method of the embodiment 1 according to the present disclosure. Further, the density of the average number of atoms of a bulk body as each of the samples is calculated. As to the density of the average number of atoms, that is calculated by the method according to the present disclosure with respect to the density of the average number of atoms of the bulk body, any of the samples falls within the range of ±10%. Thus, it is confirmed that the value sufficiently close to actual density can be calculated by the method according to the present disclosure.

Example 3

Next, PDF is calculated with the structure factor S(Q) of SiO2 glass including large distortion on a side of a large value of Q as first data, using the above-described system 100. Then, the method of the embodiment 1 and the method of the embodiment 2 according to the present disclosure are used to calculate each density of the average number of atoms. In the method of the embodiment 2, the initial value of w is set to 0.5, $p_1$ is set to 0.8, and $p_2$ is set to 1.05.

The density of the average number of atoms calculated by the method of the embodiment 1 is 0.0574 atoms/$A^3$. With respect to this, the density of the average number of atoms calculated by the method of the embodiment 2 is 0.0701 atoms/$A^3$. The density of the average number of atoms of a bulk body is 0.06613 atoms/$A^3$. Thus, when the structure factor S(Q) is largely distorted, it is confirmed that it becomes a better result of density estimation to use the method of the embodiment 2. In addition, when each conversion is made from the above-described density of the average number of atoms (atoms/A$^3$) into the normal density (g/cm$^3$), those described above become 1.91 g/cm$^3$, 2.33 g/cm$^3$ and 2.20 g/cm$^3$, respectively.

From the results described above, it is confirmed that the correction apparatus, the system, the method and the program according to the present disclosure can correct not only the structure factor but also the density.

What is claimed is:

1. A correction apparatus for correcting a structure factor, the correction apparatus comprising:

processing circuitry configured to acquire the structure factor calculated based on a total scattering data measured by an X-ray diffractometer;

calculate PDF (Pair Distribution Function) from the acquired structure factor;

calculate a first correction function and a second correction function, the first correction function includes a product of the PDF data and a cut-off function and is a function Fourier-transformed within a predetermined range, and the second correction function includes a product of a variable representing the distance of the PDF and the cut-off function and is a function Fourier-transformed within the predetermined range, the cut-off function is a function that cuts off the long distance data of the PDF data, with the range equal to or greater than a constant determined based on the first peak position $r_{1st}$ of the PDF as the long distance side;

calculate density based on the first correction function and the second correction function;

calculate a correction amount comprising the first correction function, the second correction function, and the density, the correction amount includes a difference between a product of the second correction function and the calculated density and the first correction function;

correct the structure factor using the correction amount, the correction of the structure factor is performed by adding or subtracting the amount of correction to the structure factor before correction and calculating the structure factor after correction; and calculate an R-factor value indicating correction accuracy, the R-factor value comprising the first correction function and the second correction function.

2. The correction apparatus according to claim 1, wherein the R-factor value indicates a change rate of the density.

3. The correction apparatus according to claim 2, wherein the processing circuitry is further configured to calculate a ratio at which a constraint term is weighted, calculate the constraint term based on a value of each of the first correction function and the second correction function in a limited range;

wherein the density comprises a product of the constraint term and the ratio; and wherein the ratio increases or decreases according to increase/decrease of the R-factor value.

4. The correction apparatus according to claim 1, wherein the processing circuitry is further configured to determine a first peak position $r_{1st}$ of the PDF, wherein the predetermined range is from 0 to $r_{1st}$.

5. The correction apparatus according to claim 1, wherein the cut-off function is a monotone decreasing function taking a value of from 1 to 0 in a domain of the cut-off function.

6. The correction apparatus according to claim 1, wherein the processing circuitry is further configured to calculate the structure factor based on a type of a radiation source, a wavelength, a shape of a sample, arrangement, kinds of constituent elements, a composition and an absorption coefficient in total scattering data by acquiring the total scattering data of the sample, and acquire the calculated structure factor.

7. A system comprising:

an X-ray diffractometer comprising an X-ray generator that generates X-rays, a detector that detects the X-rays, and a goniometer; and a correction apparatus for correcting a structure factor, the correction apparatus including processing circuitry configured to acquire the structure factor calculated based on a total scattering data measured by the X-ray diffractometer;

calculate PDF (Pair Distribution Function) from the acquired structure factor;

calculate a first correction function and a second correction function, the first correction function includes a product of the PDF data and a cut-off function and is a function Fourier-transformed within a predetermined range, and the second correction function includes a product of a variable representing the distance of the PDF and the cut-off function and is a function Fourier-transformed within the predetermined range, the cut-off function is a function that cuts off the long distance data of the PDF data, with the range equal to or greater than a constant determined based on the first peak position first of the PDF as the long distance side;

calculate density based on the first correction function and the second correction function;

calculate a correction amount comprising the first correction function, the second correction function, and the density;

correct the structure factor using the correction amount, the correction of the structure factor is performed by adding or subtracting the amount of correction to the structure factor before correction and calculating the structure factor after correction; and calculate an R-factor value indicating correction accuracy, the R-factor value comprising the first correction function and the second correction function.

8. A method for correcting a structure factor, the method comprising:

acquiring the structure factor calculated based on a total scattering data measured by an X-ray diffractometer;

calculating PDF (Pair Distribution Function) from the acquired structure factor;

calculating a first correction function, and a second correction function, the first correction function includes a product of the PDF data and a cut-off function and is a function Fourier-transformed within a predetermined range, and the second correction function includes a product of a variable representing the distance of the PDF and the cut-off function and is a function Fourier-transformed within the predetermined range, the cut-off function is a function that cuts off the long distance data of the PDF data, with the range equal to or greater than a constant determined based on the first peak position $r_{1st}$ of the PDF as the long distance side;

calculating density based on the first correction function and the second correction function;

calculating a correction amount comprising the first correction function, the second correction function, and the density, the correction amount includes a difference between a product of the second correction function and the calculated density and the first correction function;

correcting the structure factor using the correction amount, the correction of the structure factor is performed by adding or subtracting the amount of correction to the structure factor before correction and calculating the structure factor after correction; and calculating an R-factor value indicating correction accuracy, the R-factor value comprising the first correction function and the second correction function.

9. A non-transitory computer-readable storage medium storing computer-readable instructions thereon which, when executed by a computer, cause the computer to perform a method, the method comprising:

acquiring the structure factor calculated based on a total scattering data measured by an X-ray diffractometer;

calculating PDF (Pair Distribution Function) from the acquired structure factor;

calculating a first correction function, and a second correction function, the first correction function includes a product of the PDF data and a cut-off function and is a function Fourier-transformed within a predetermined range, and the second correction function includes a product of a variable representing the distance of the PDF and the cut-off function and is a function Fourier-transformed within the predetermined range, the cut-off function is a function that cuts off the long distance data of the PDF data, with the range equal to or greater than a constant determined based on the first peak position first of the PDF as the long distance side;

calculating density based on the first correction function and the second correction function;

calculating a correction amount comprising the first correction function, the second correction function, and the density, the correction amount includes a difference between a product of the second correction function and the calculated density and the first correction function;

correcting the structure factor using the correction amount, the correction of the structure factor is performed by adding or subtracting the amount of correction to the structure factor before correction and calculating the structure factor after correction; and calculating an R-factor value indicating correction accuracy, the R-factor value comprising the first correction function and the second correction function.

* * * * *